US007206332B2

(12) United States Patent
Kwan et al.

(10) Patent No.: US 7,206,332 B2
(45) Date of Patent: Apr. 17, 2007

(54) OPTIMIZATION OF MCS AND MULTI-CODE WITH TFCI SIGNALING

(75) Inventors: Raymond Kwan, Helsinki (FI); Eeva Poutiainen, Helsinki (FI); Seppo Hämäläinen, Espoo (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 10/184,022

(22) Filed: Jun. 25, 2002

(65) Prior Publication Data

US 2003/0081692 A1 May 1, 2003

Related U.S. Application Data

(60) Provisional application No. 60/301,078, filed on Jun. 26, 2001, provisional application No. 60/300,674, filed on Jun. 25, 2001.

(51) Int. Cl.
*H04B 1/00* (2006.01)
*H04B 7/216* (2006.01)
*H04L 23/00* (2006.01)

(52) U.S. Cl. ............ 375/140; 375/146; 375/377; 370/441

(58) Field of Classification Search ............ 375/377, 375/356, 354, 130, 146, 147, 140, 149; 370/328, 370/329, 335, 342, 431, 441
See application file for complete search history.

(56) References Cited

U.S. PATENT DOCUMENTS

| 5,491,727 | A | * | 2/1996 | Petit | 375/358 |
|---|---|---|---|---|---|
| 5,781,542 | A | * | 7/1998 | Tanaka et al. | 370/342 |
| 6,115,580 | A | | 9/2000 | Chuprun et al. | 455/1 |
| 6,330,288 | B1 | * | 12/2001 | Budka et al. | 375/296 |
| 6,366,601 | B1 | * | 4/2002 | Ghosh et al. | 375/130 |
| 6,389,066 | B1 | | 5/2002 | Ejzak | 375/224 |
| 6,700,881 | B1 | * | 3/2004 | Kong et al. | 370/335 |
| 6,738,370 | B2 | * | 5/2004 | Ostman | 370/349 |
| 7,027,782 | B2 | * | 4/2006 | Moon et al. | 455/102 |
| 2003/0112744 | A1 | * | 6/2003 | Baum et al. | 370/206 |
| 2003/0123598 | A1 | * | 7/2003 | Gollamudi et al. | 375/377 |

FOREIGN PATENT DOCUMENTS

EP  1229678  8/2002

OTHER PUBLICATIONS

"Adaptive Modulation for Fading Channels", N. Ericsson (from Internet).

(Continued)

*Primary Examiner*—Tesfaldet Bocure

(57) ABSTRACT

A two-dimensional optimization between adaptive modulation and coding (AMC) and multi-code transmission targets the best bit rate at which a highest useable modulation and coding scheme (MCS) achieves a maximum allowed number of channelization codes or less. The optimized MCS and number of channelization codes at a best bit rate is communicated from a transmitter to a receiver, possibly also with power information for instance using a transport format combination indicator (TFCI). A user equipment may play the role of carrying out the optimization and signaling the result to the Node B or may instead receive the result as carried out by the Node B or RNC in response to a radio link quality measurement sent from the UE to the Node B.

82 Claims, 9 Drawing Sheets

OTHER PUBLICATIONS

"Adaptive Coded Modulation for Fading Channels", A. Goldsmith,et al *IEEE Transactions on Communications*, vol. 46, No. 5, May 1998, pp. 595-602.

"On Scheduling and Adaptive Modulation in Wireless Communication", M. Ericsson, Uppsala University, Jun. 2001.

"Power Prediction on Broadband Channels", M. Sternad et al from Internet.

"PCC Wireless IP—Optimizing Throughput and QoS over Fading Channels", M. Sternad et al (from Internet).

Adaptive Modulation and Scheduling of IP Traffic over Fading Channels, N. Ericsson (from Internet).

H. Holma et al, "WCDMA for UMTS", John Wiley & Sons, rev and updated Spring 2001, p. 70, Fig. 6.1.

"Symbol Rate and Modulation Level-Controlled Adaptive Modulation/TDMA/TDD System for High-Bit-Rate Wireless Data Transmission", T. Ue et al, *IEEE Trans. on Vehicular Technology*, vol. 47, No. 4, Nov. 1998, pp. 1134-1147.

3G TS 25.213 v4.0.0 (Mar. 2001), 3rd Generation Partnership Project, Technical Specification Group Radio Access network, Spreading and Modulation (FDD) (Release 4).

3GPP TR 25.950 v4.0.0 (Mar. 2001); 3rd Generation Partnership Project; Technical Specification Group Radio Access Network; UTRA High Speed Downlink Packet Access (Release 4).

"Channel Separation, Alphabet Size, and Code Rate in Cellular Radio Systems", P. Malm, Licentiate in Engineering Thesis, Lund University, Sweden, Feb. 1999.

3G TS 25.301 v3.3.0 (Dec. 1999); 3rd Generation Partnership Project; Technical Specification Group Radio Access Network; Radio Interface Protocol Architecture (3G TS 25.301 version 3.3.0).

3GPP TS 25.223 v4.0.0 (Mar. 2001); 3rd Generation Partnership Project; Technical Specification Group Radio Access Network; Spreading and Modulation (TDD) (Release 4).

TR 101 112 v3.2.0 (Apr. 1998); Universal Mobile Telecommunications System (UMTS); Selection Procedures for the Choice of Radio Transmission Technologies of the UMTS (UMTS 30.03 version 3.2.0).

3G TS 25.302 v3.3.0 (Jan. 2000); 3rd Generation Partnership Project; Technical Specification Group Radio Access Network; Services Provided by the Physical Layer (3G TS 25.302 version 3.3.0).

"Capacities of Single-Code and Multicode DS-CDMA Systems Accommodating Multiclass Services", Lee et al., IEEE Transactions on Vehicular Technology, vol. 48, No. 2, Mar. 1999, pp. 376-384.

* cited by examiner

FIG.10    QPSK 1/4, 5 codes
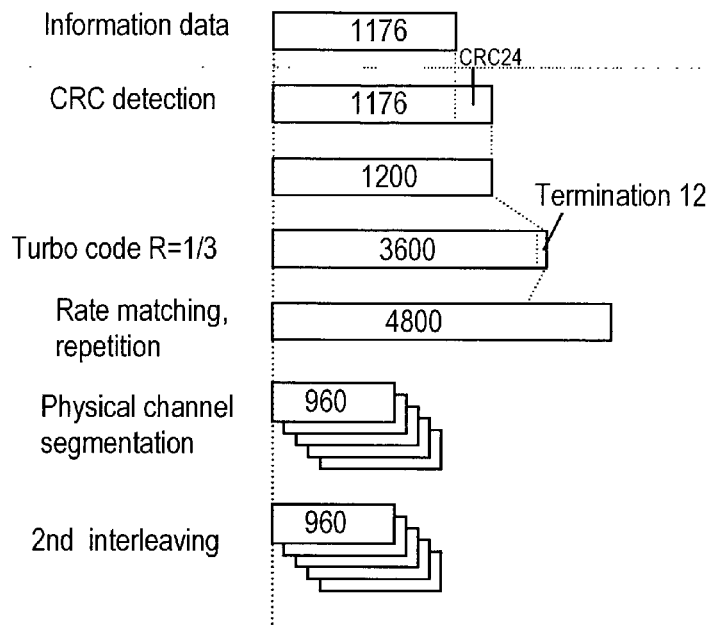
FIG. 4
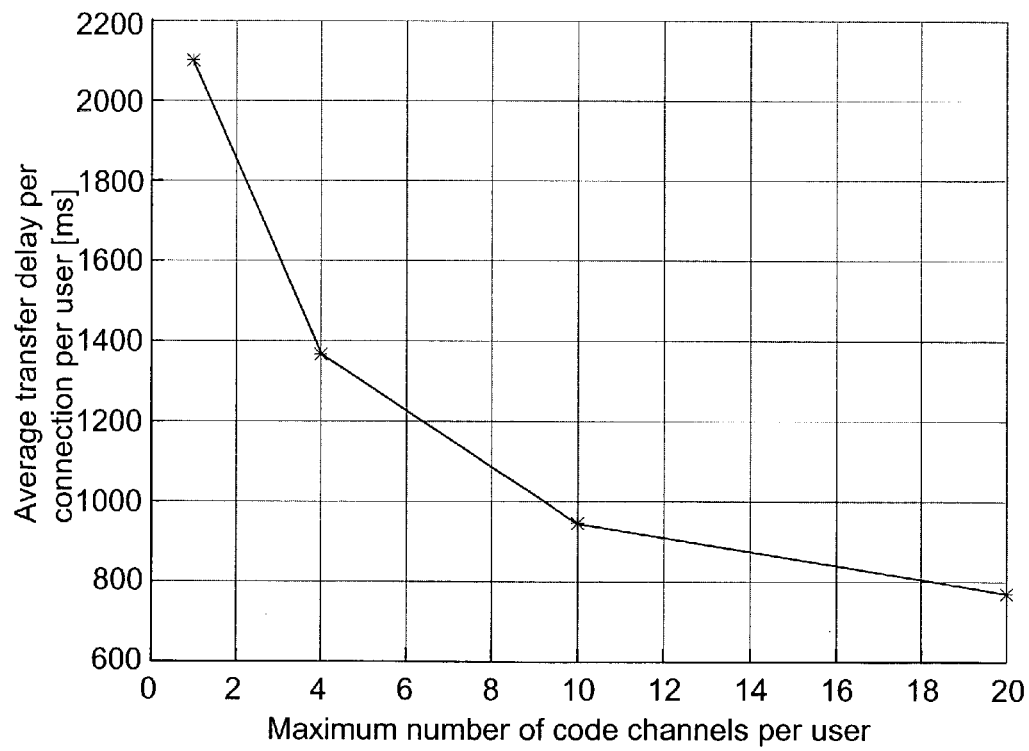

OPTIMIZATION OF MCS AND MULTI-CODE WITH TFCI SIGNALING

This application claims the benefit of U.S. Provisional Application(s) No(s).: 60/300,674 filed Jun. 25, 2001; and 60/301,078 Jun. 26, 2001.

BACKGROUND OF THE INVENTION

1. Technical Field

The present invention relates to an algorithm for optimizing a number of spreading codes used for channelization (channelization-code set) as well as the type of modulation and (error correction) coding scheme (MCS) used for modulating a physical channel transmitted over a radio link in a mobile telecommunications network, as well as signaling the optimized MCS and channelization-code set information and, more particularly, to extending adaptive modulation and coding in High Speed Data Packet Access (HSDPA) and Wideband Code Division Multiple Access (WCDMA).

2. Discussion of Related Art

Scheduling and adaptive modulation and coding have been considered in wireless communications in both an academic and a commercial context. For instance, in a thesis entitled "On Scheduling and Adaptive Modulation in Wireless Communications," by Nilo Kasimiro Ericsson (June 2001), it is pointed out that adaptivity on all levels is the most important means for achieving high bandwidth efficiency in the wireless link while satisfying the required communication quality for the served applications. It is further noted that utilization of knowledge of the channel state avoids a worst-case design by adapting as conditions vary. It is shown that rather than coping with channel variations in a worse-case manner, the modulation format can be changed as the channel signal-to-noise ratio (SNR) varies. See, for instance, FIG. 5.3 on page 29 of the above-mentioned thesis. For a selected symbol error probability the modulation level can be adapted according to the variations in the channel SNR. The same subject is treated in a thesis by Peter Malm, entitled "Channel Separation, Alphabet Size, and Code Rate in Cellular Radio Systems," dated February 1999. Maim analyzes how adjacent channel separation, channel alphabet size, and channel code rate affects the cellular system's performance. One of the conclusions of the analysis is that the spectrum efficiency of a cellular system does not improve beyond a certain point with increasing channel alphabet size. Instead, small-to-medium alphabet sizes exhibit the best performance. This is because the frequency reuse mechanism punishes large alphabets by demanding a large cluster size. As the cluster size increases faster than the throughput, the spectrum efficiency does not benefit from large-channel alphabets.

Reference may also be had to the current literature such as "Adaptive Coded Modulation for Fading Channels" by Goldsmith et al, IEEE Transactions on Communications, Vol. 46, No. 5, May 1998 and "Symbol Rate and Modulation Level-Controlled Adaptive Modulation/TDMA/TDD System for High-Bit-Rate Wireless Data Transmission" by T. Ue et al, IEEE Transactions on Vehicular Technology, Vol. 47, No. 4, November 1998 for the state of the art.

In the standards realm, the Third Generation Partnership Project (3GPP) has undertaken a study to determine the feasibility for high-speed downlink packet access (HSDPA), where techniques like adaptive modulation and coding, hybrid ARQ (HARQ) and other advanced features are discussed and evaluated with the goal to increase throughput, reduce delay and achieve high peak rates. See 3GPP TR 25.950 v4.0.0 (2001–03) "UTRA High-Speed Downlink Packet Access," Release 4. In the foregoing 3GPP document, it is explained that in cellular communication systems, the quality of the signal received by a UE varies depending on a number of factors—the distance between the desired and interfering base stations, path loss exponent, log-normal shadowing, short-term Rayleigh fading and noise. In order to improve system capacity, peak data rate and coverage reliability, the signal transmitted to and by a particular user can be modified to account for the signal quality variation through a process commonly referred to as link adaptation. Traditionally, CDMA systems have used fast power control as the preferred method for link adaptation.

In the 3GPP study, Adaptive Modulation and Coding (AMC) have been envisioned as an alternative link adaptation method that promises to raise the overall system capacity. AMC provides the flexibility to match the modulation-coding scheme to the average channel conditions for each user. With AMC, the power of the transmitted signal is held constant over a frame interval, and the modulation and error correction coding format is changed to match the current received signal quality or channel conditions. In a system with AMC, users close to the base station (BTS) are typically assigned higher order modulation with higher code rates (e.g., 64 QAM with R=3/4 turbo codes), but the modulation-order and/or code rate will decrease as the distance from BTS increases. AMC is most effective when combined with fat-pipe scheduling techniques, such as those enabled by the Downlink Shared Channel (DSCH) of the 3GPP. On top of the benefits attributed to fat-pipe multiplexing, AMC combined with time domain scheduling offers the opportunity to take advantage of short-term variations in a UEs fading envelope so that a UE is always being served on a constructive fade.

In the spreading code domain, it has been suggested that HSDPA transmission might be able to use a fixed spreading factor and multi-code transmission. See TR 25.950 v4.0.0 (2001–03) at Chapter 6.3.1. The selection of such a fixed HSDPA spreading factor would be based on an evaluation of the impact on performance, UE complexity, and flexibility (granularity in the overall allocation of capacity for HSDPA transmission). Consideration is also recommended to what possible extent there could be any additional flexibility advantage in supporting a variable spreading factor for HSDPA as compared with the impact on complexity, etc. See 3G TS 25.213 v4.0.0 (2001–03) "Spreading and modulation (FDD)" and 3G TS 25.223 v4.0.0 (2001–03) "Spreading and Modulation (TDD)" for a general overview of spreading, including channelization, scrambling and QPSK modulation.

Although scheduling for adaptive modulation and coding has already been considered for wireless communications, there has been no concrete proposal yet advanced for a packet scheduling algorithm that optimizes the user throughput based on the selection of the number of Orthogonal Variable Spreading Factor (OVSF) codes in conjunction with the modulation and (error correcting) coding scheme (MCS) in a WCDMA network. Moreover, there has not been any recognition of the need for signaling an appropriate power level based on such an optimization.

DISCLOSURE OF INVENTION

An object of the present invention is to provide optimized adaptive modulation and coding and multi-code transmission for a radio link in a mobile telecommunications network Another object is to provide appropriate signaling to signal the optimization from a transmitter to a receiver over the radio link.

According to a first aspect of the invention, a method for use in adaptively modulating a radio link in a mobile communications system according to a time varying radio link quality, includes the steps of selecting a number of channelization codes and a modulation and coding scheme (MCS) from among a plurality of MCSs for use by a transmitter over the radio link according to said time varying radio link quality, and signaling information relating to said adaptively selected MCS and said number of channelization codes from said transmitter to a receiver of said radio link.

Further according to the first aspect of the invention, the MCS and the number of channelization codes are selected from a prestored look-up table. The look-up table may be made with a number of possible channelization codes associated with each MCS. Moreover, the look-up table may be made so that, first with a lower MCS, allowed channelization codes are listed and wherein for each subsequent MCS only code channels are listed that provide a higher bit rate than a maximum bit rate of a previous MCS with a maximum number of allowed channelization codes.

Further still in accord with the first aspect of the invention, the method further comprises a step of measuring the radio link quality prior to the step of adaptively selecting.

According still further to the present invention, the receiver is a user equipment. The above-mentioned step of measuring may be carried out in such a user equipment acting as the receiver of the radio link. The steps of adaptively selecting and signaling may be carried out in the transmitter or elsewhere than in the user equipment acting as the receiver of the radio link, wherein the method further comprises the step of providing a measurement information element or signal from the user equipment to the transmitter of the radio link, the measurement signal or information element having a magnitude indicative of the radio link quality measured in the above-mentioned step of measuring. The transmitter may be a base station or a radio network controller. The step of signaling may be carried out by the transmitter transmitting the information relating to the adaptively selected MCS and the number of channelization codes on a control channel shared among a plurality of user equipment receivers. The information may be transmitted on the control channel prior to the transmitter transmitting a downlink shared transport channel to the user equipment receivers. The control channel may be organized to transmit the information prior to automatic repeat parameters also transmitted on the control channel.

Still further according to the first aspect of the invention, for a target radio link quality, said step of adaptively selecting comprises the steps of testing, one after another, increasingly higher order MCSs each capable of achieving a specified error measure for said channel having said target radio channel quality, and selecting a highest order MCS that tests for a maximum allowed number of channelization codes or less without falling below said target radio channel quality.

Further still in accordance with the first aspect of the invention, the transmitter is a user equipment.

Still further in accordance with the first aspect of the invention, the step of signaling is carried out using a transport format combination indicator (TFCI).

Still in further accord with the first aspect of the invention, for a target radio channel quality, said step of adaptively selecting comprises the steps of starting with a lowest order modulation and coding scheme (MCS) capable of achieving a specified error measure according to said time varying radio channel quality, testing said lowest order MCS with an increasing number of channelization codes at correspondingly different bit rates until a highest number of channelization codes is tested for said lowest order MCS or for a subsequently tested higher order MCS without causing the channel to fall below said target radio channel quality and thereafter selecting said lowest order MCS or a lowest higher order MCS that tests for said highest number of channelization codes without causing the channel to fall below said target radio channel quality.

Further still in accord with the first aspect of the invention, the step of signaling information related to said selected lowest order MCS or lowest higher order MCS from said transmitter to said receiver.

In further accord with the first aspect of the invention, the step of signaling is carried out using a transport format combination indicator (TFCI).

According to a second aspect of the invention, a method for selecting a modulation and coding scheme (MCS) for use in a mobile communications system, comprises the steps of selecting an MCS capable of achieving a specified error measure for a channel having a time-varying radio channel quality, and selecting a number of channelization codes with said MCS that is useable with the selected MCS without falling below a target radio channel quality.

Further according to the second aspect of the invention, the method further comprises the step of signaling information relating to said selected MCS from a transmitter of said system to a receiver of said system. A user equipment (UE) can fulfill the role of transmitter or receiver, depending on whether the method is carried out in the UE or in the Node B ("base station" of 3GPP)/RNC (Radio Network Controller). The step of signaling may be carried out using a transport format combination indicator (TFCI). The transmitter may be a user equipment or the receiver may be a user equipment.

In further accord with the second aspect of the present invention, the MCS and the number of channelization codes are selected from a prestored look-up table. The look-up table may be made with a number of possible code channels associated with each MCS.

Still further in accord with the second aspect of the invention, the look-up table may be made so that, first with a lowest MCS, allowed channelization codes are listed and wherein for each subsequent MCS only code channels are listed that provide a higher bit rate than a maximum bit rate of a previous MCS with a maximum number of allowed channelization codes.

In still further accord with the second aspect of the present invention, said method further comprises the step of measuring the radio channel quality prior to the steps of selecting an MCS and selecting a number of channelization codes. The step of measuring may be carried out in a user equipment. In that case, the steps of selecting and signaling may be carried out in the transmitter or elsewhere than in the user equipment acting as the receiver of the radio link. Also in that case, the transmitter may be a base station or radio network controller. The method may further comprise the step of providing a measurement signal from the user equipment to the transmitter of the radio channel, the measurement signal having a magnitude indicative of the radio channel quality received at the user equipment. The step of signaling said information, if carried out by the transmitter, may be transmitted on a control channel shared among a plurality of user equipment receivers. The information may be transmitted on the control channel prior to the transmitter transmitting a downlink shared transport channel to the user equipment receiver. The control channel may be organized to transmit the information relating to the selected MCS and channelization codes prior to automatic repeat parameters also transmitted on the control channel.

According to a third aspect of the invention, a method for use in a mobile communications system having a radio channel with a time-varying radio channel quality, said method for adaptively selecting a modulation and coding scheme (MCS) from among a plurality of MCSs of differing orders of complexity, wherein for a given adaptation based on a target radio channel quality, comprises the steps of starting with a lowest order MCS and thereafter continuing with higher order MCSs all capable of achieving a specified error measure according to the time-varying radio channel quality, testing said lowest order MCS with increasingly larger numbers of channelization codes at correspondingly different bit rates until a maximum allowed number of channelization codes or less is tested for said lowest order MCS or for a subsequently tested higher order MCS without causing the radio channel to fall below said target radio channel quality and thereafter selecting said lowest order MCS or selecting a highest order MCS available that tests for said maximum allowed number of channelization codes or less without causing the radio channel to fall below the target radio channel quality.

Further according to the third aspect of the invention, the method further comprises the step of signaling information related to said selected lowest order MCS or highest order MCS from a transmitter to a receiver of said radio channel. A user equipment can fulfill the role of transmitter or receiver. The step of signaling may be carried out using a transport format combination indicator (TFCI).

In further accord with the third aspect of the invention, the MCSs are available for testing in association with the channelization codes from a prestored look-up table. The look-up table may be made with a number of possible code channels associated with each MCS. The look-up table may be made so that, first with a lowest MCS, all out channelization codes are listed and wherein for each subsequent MCS only code channels are listed that provide a higher bit rate than a maximum bit rate of a previous MCS with a maximum number of allowed channelization codes.

In still further accord with the third aspect of the invention, the method further comprises the step of measuring the radio channel quality prior to the step of selecting. The step of measuring may be carried out in a user equipment. In that case, the steps of testing and selecting are carried out in the transmitter or elsewhere than in the user equipment. Also in that case, the transmitter may be a base station or radio network controller. Likewise, the step of signaling may be carried out by the transmitter transmitting the information on a control channel shared among a plurality of user equipment receivers. The information may be transmitted on the control channel prior to the transmitter transmitting a downlink shared transport channel to the user equipment receiver. The control channel may be organized to transmit the information relating to the adaptively selected MCS and the number of channelization codes prior to automatic repeat parameters also transmitted on the control channel.

These and other objects, features and advantages of the present invention will become more apparent in light of the detailed description of a best mode embodiment thereof, as illustrated in the accompanying drawing.

BRIEF DESCRIPTION OF THE DRAWINGS

FIG. 4 shows the average transfer delay per connection as a function of the maximum number of code channels per user for the above-mentioned HSDPA embodiment.

FIG. 10 shows a first example of channel coding and physical segmentation for the QSPK ¼, 5 codes of Table 2.

BEST MODE FOR CARRYING OUT THE INVENTION

Figure 1:
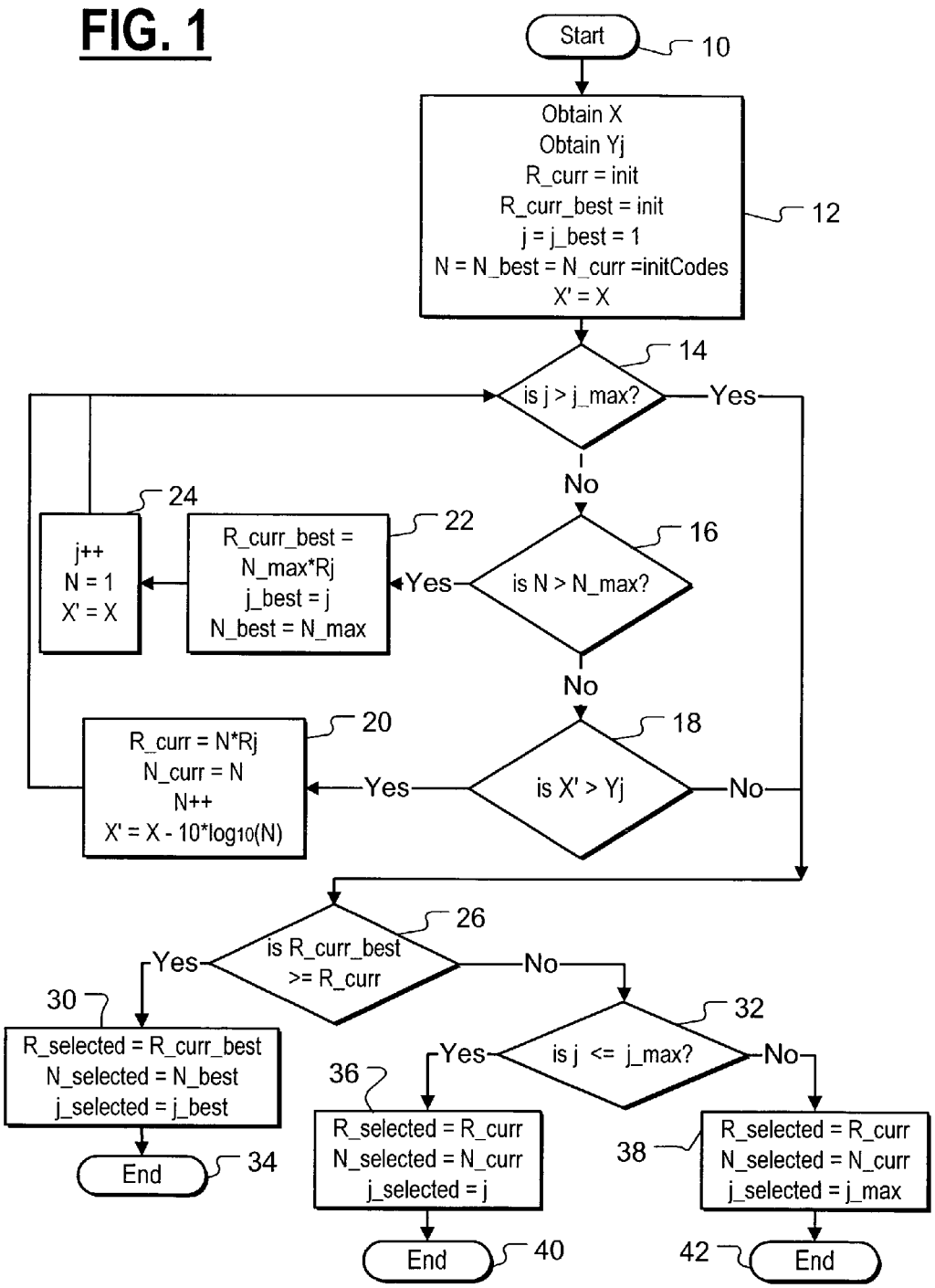
FIG. 1 shows a flowchart of a two-dimensional optimization of the use of multi-code channelization with adaptive modulation and error correcting coding in cellular radio systems, according to the present invention.

FIG. 1 shows a flow chart for carrying out a two-dimensional optimization of multi-code channelization and adaptive modulation and (error-correction) coding, according to the present invention. It is assumed that channel prediction is employed in the background to accurately predict the received radio link power variations several milliseconds into the future, even for fast-moving vehicular users of mobile telephones. For instance, it is known that signal-to-noise measurements of various channels can be performed continuously and estimations fed into a buffer. The contents of the buffer are used by a channel predictor to obtain future estimations of the channel quality. The prior art has shown that such predictions on a radio link basis can be used together with a target area to assign the modulation complexity in order to increase the transfer of data over the wireless link without error and at a higher rate. A scheduling decision is then broadcast to participating users. See for instance Chapters 2.2 and 5.3 of the thesis by N. K. Ericsson and also the publication of "Power Prediction on Broadband Channels" by M. Sternad et al in IEEE Vehicular Technology Conference, Spring 2001 (VTC 2001S), Rhodes, Greece, May 6–9, 2001.

In addition to finding an appropriate modulation complexity level according to the proposals of the prior art relating to adaptive modulation and coding, FIG. 1 shows a way to select multiple channelization codes for use with a selected modulation complexity level in an optimized way along with selecting an appropriate bit rate selected according to the increase in channelization.

Referring now to FIG. 1, after entering in a start step 10, a step 12 is executed to obtain the actual radio link or channel quality parameter, e.g., DSCH $E_b/N_0$ (X) and the target quality, e.g., $E_b/N_0$ ($Y_j$) for a specified Frame Error Ratio (FER) of the jth MCS (modulation and coding scheme where "coding" means error correcting coding). $Eb/N0$ refers to the ratio between the energy or power density per bit and the interference and noise power density. For speech service this ratio is normally on the order of 5 dB. Speech service with a bit rate of 12.2 kbps has a processing gain of 25 db=$10*\log_{10}$ (3.84e6/12.2e3) using a chip rate of 3.84 Mbps. For such speech service the required wideband signal to interference ratio is therefore 5 db minus the processing gain=−20 db. In other words, the signal power can be 20 db under the interference and the WCDMA receiver can still detect the signal. Instead of FER, some other similar error measure or parameter such as symbol error probability or BLER (Block Error Ratio) could be used. Likewise some other channel or link quality parameter besides $Eb/N0$ could be used. Normally references to $Ec/I0$ is assumed to mean wideband chip energy per interference (+noise) and $Eb/N0$ (or more correctly $Eb/I0$ or $Eb/(I0+N0)$ is assumed to mean narrowband bit energy per interference (+noise).

This algorithm can also be used to find out the optimized MCS and number of code channels ("channelization" or "spreading" codes) for a UE when code multiplexing among UEs. The codes to which the DSCH is mapped can be shared between users in both the code domain and the time domain. In this case, e.g., the fixed DSCH power and/or the code channels can initially be divided between the UEs and, if the power is divided, a quality value corresponding to this divided power can be used in the optimization algorithm presented in this invention to determine the optimized values of MCS and the code channels, and if some number of code channels are allocated already to another UE, it has to be taken into account, when using the algorithm for the UE. In addition, the code multiplexing could be done e.g. so that the maximum number of codes for a UE can be found out after an allocation for another (or many other) UEs has been done, and some code channels are "left over" from the other UEs and thus can be used for other UEs. Then the allocation for the UE is done with this number of codes that are left yet to be allocated if there is some more power available in the Node B that could be allocated for the DSCH for the use of the UE.

One way to carry out the algorithm of FIG. 1 is to have the various UEs report the DSCH $Eb/N0$ or corresponding (possibly wideband) value (e.g. Common Pilot Channel (CPICH) $Ec/Io$) to the packet scheduler, e.g. in the RNC or Node B (currently it is assumed for HSDPA that the packet scheduler is in the MAC-rhs entity in the Node B). However, it can also be that the algorithm is running in the UE instead of the RNC or Node B. In that case, the UE decides on the best MCS and the number of code channels and reports these selected values to the network. Based on that information Node-B or RNC then does scheduling. The scheduled number of code channels (channelization-code set) and their power levels can be different than that requested by UE. It can also be done so that the Node B or the RNC reports the power available for that UE and the maximum number of code channels among which the algorithm running in the UE can decide, how many code channels it can support. The UE reports the selected MCS and the number of code channels to the network. These situations could occur, e.g., if this invention were used for code multiplexing the code resources between different users, as mentioned above. The current best bit rate (R_curr_best) is set to an initial value. The definitions of the various variables shown in FIG. 1 are listed as follows:

X=DSCH $Eb/N0$
Yj=Target $Eb/N0$ for a specified FER of the jth MCS
j=The jth MCS (1 to j_max)
j_best=highest MCS used
j_max=Maximum number of MCS
j_selected=selected value for j
Rj=Single code bitrate of the jth MCS
R_curr=current bitrate
R_curr_best=current best bitrate
R_selected=selected bitrate
N=Number of channelization codes used/user
N_best=highest N used
N_max=Maximum value for N
N_curr=Current value for N
N_selected=selected value for N In addition to setting an initial value for the current best bit rate (R_curr_best), the value of the current bit rate (R_curr) is also set to an initial value. This initial value can be, e.g. the bitrate corresponding to the Rj (single code bitrate) corresponding to the lowest MCS (j=1) or, e.g., zero. The j variable (jth MCS) is set to one along with the highest MCS used (j_best). The number of channelization codes used per user (N) and the current value of N (N_curr) as well as the highest N used (N_best) are also set to the smallest allowed number of code channels (channelization codes) corresponding to the lowest MCS (j=1), e.g. 1, in the step 12. If the smallest allowed number of code channels corresponding to the lowest MCS (j=1) is different from one, the initial values of N, N_curr and N_curr_best are set to this value. Furthermore, if the smallest value of N differs between different MCSs, then later if testing another MCS (j) for a given X, N will be set to the smallest number of channelization codes corresponding to that MCS. Also, the maximum number of channelization codes corresponding to different MCSs could differ, and this can be taken into account in the flow of the optimization algorithm by setting the N_max always to correspond to the current MCS under test, when testing the chance to use the different MCSs for a given $Eb/N0$ value (X).

The target $Eb/N0$s (Yj) referred in the flow chart and the explanation below, can be achieved e.g. from link level simulation results, or from real experimental data. These target $Eb/N0$s (Yj) could also be adjusted during the usage of the network, e.g., if it is noted, that the experienced FERs (or e.g. BLERs) seem to be differing from the targeted ones. This is made so that during the course of a call, the FER (or e.g. BLER) is measured and compared to the given value with Yj. If given FER and measured FER differ, the $Eb/N0$ target (Yj) for a given FER is adjusted. The target is to obtain the desired FER with the selected MCS and number of code channels (channelization codes). Adjustment can be stepwise, when Yj is corrected after every frame or after a set of frames. Then Yj can be increased by a step if the measured FER is above the target and decreased by a step (that can be same or different than with adjustment upwards) if the FER is below the target. Also other adjustment schemes can be used. Yj may be a common value for several UEs or each UE may have separate values corresponding their radio environments.

After initialization in the step 12, a step 14 is executed for the first time to determine if the jth MCS (j) is greater than the Maximum Number of MCS (j_max) or not. If not, a step 16 is executed to determine if the number of codes used per user (N) is greater than the Maximum value for N (N_max). If not, a step 18 is executed for the first time to determine if the DSCH $Eb/N0$ (X) obtained previously in step 12 is greater than the target $Eb/N0$ (Yj) corresponding to the MCS under test (j) or not. If so, the possibility of using more codes with higher bit rates is indicated. Therefore, a step 20 is executed. In this step 20, the current bit rate (R_curr) is changed to equal N (the number of codes used per user) times the single code bit rate of the jth_MCS (Rj). The transition from step 18 to step 20 is part of an "outer loop" illustrated in FIG. 1 which may be executed several times, once for each incremented value of N. This is because the value of N is increased in the step 20 by one or more increments as indicated (N++). For instance, the step could be to set N to N+1 (N→N+1). The power is also divided between the N channels depending on the number of codes. Upon further repetition of this outer loop, if the divided DSCH Eb/N0 does not go below the target in step 18 first, eventually the value of N will be found in the step 16 to be greater than N_max. In that case an "inner loop" comprising steps 22, 24 will be executed wherein N is reset to equal the smallest possible value of multicodes corresponding to the next MCS, e.g. 1, and j is increased so as to increment to the next level of MCS complexity in order to try out possible different multi-code combinations with the next higher MCS selected first. Thus, the outer loop of steps 14, 16, 18, 20 can be viewed as a fast loop wherein various multicodes are tested on individual MCSs in order, with the DSCH Eb/N0 reduced (see below) in proportion to the number of codes tested in each pass. The inner loop is then viewed as a slow loop for changing the MCS to the next higher order complexity after exhausting (maximizing) the possibilities of matches between the MCS under test and the available multicodes without having gone under the target Eb/N0. After the optimization takes place, the subsequent steps (to be described below) select the bit rate for use with the optimized lowest order of MCS that is able to achieve a maximal (not necessarily N_max) number of codes without falling below the target Eb/N0.

Referring back to the step 20 of FIG. 1, after the current bit rate (R_curr) is set to a multiple of the Single code bit rate of the jth MCS, the current value for N (N_curr) is then set to N. N is then increased (N++) by, for instance, in an increment of 1. After that, the previously obtained value of DSCH Eb/N0 (X) is modified as follows:

$$X' = X - 10 * \log_{10}(N) \qquad (1)$$

Equation 1 as carried out in step 20 takes into account the fact that the increase in the value of N represents an increase in the number of channels or channelization branches being utilized prior to modulation, one for each increase in the number of spreading codes used. Therefore, the power level will have to be decreased proportionately for each such increase of channelization codes and X' represents this reduced power level. It should be realized that the sum of the powers at level X' of the individual channels will equal the original X value. This is a straightforward way to take into account the needed decrease in power so as to enable the algorithm of FIG. 1 to determine the proper optimization of multicode and MCS as disclosed herein in a non-limiting way, realizing it would be done in another way.

After execution of the step 20, the step 14 is reexecuted to determine if j has yet exceeded j_max or not. If this is the first execution of the outer loop, then j will not yet be greater than j_max and furthermore the value of N will not be greater than N_max yet and therefore the steps 14, 16, 18 will be reexecuted. Assuming the value of X' is still greater than Yj, the step 20 will be reexecuted, and N will be increased again to increase the number of codes used per user so as to find out if such an increase can be allowed or tolerated, as determined in steps 16, 18, respectively. If so, the variables of step 20 will be adjusted again. The outer loop will be executed repeatedly for a given MCS until either N is greater than N_max (not allowed) or the condition X' is greater than Yj (not tolerated) in step 18 is not met anymore assuming j has not exceeded j_max.

If, after one or more repetitions of the outer loop with N increased by step 20 to a number greater than N_max where the number of codes has been maximized for a currently best candidate MCS, as determined in step 16, the possibility still exists that a higher order MCS can be used. Therefore, the "inner loop" steps 22, 24 are executed to store the best current candidate value for the bit rate (R_curr_best) as just found, i.e., as the Maximum value for N (N_max corresponding to that MCS (j)) times the Single code bit rate of the jth MCS (Rj). The highest MCS used (j_best) is then set equal to the current value of j (j) to store the best current candidate MCS's identity before j is increased in the next step 24 while at the same time the highest N used (N_best) is set equal to the maximum value for N (N_max). This effectively stores the last MCS with the maximum number of codes while the next MCS is tested to see if it can do as well.

After execution of step 22 as described above, and shown in FIG. 1, the step 24 is executed to increase j (j++) and to reset N to equal the smallest allowed number of code channels corresponding to the next value of j, e.g. 1. If j is larger than j_max due to the increment (j++), and thus there is not a MCS corresponding to that value of j, the value for N can remain the same as it is, because then next time when step 14 is executed, MCS maximum has been reached, and thus the steps 16, 18, 20, 22 and 24 will not be executed anymore. The outer loop will then be repeated for the next higher MCS for all values of N until either N exceeds N_max (meaning there is now a new best candidate MCS), as determined in the step 16 or one of the decision blocks 14, 18 forces a transition out of the inner loop/outer loop portion of the flowchart of FIG. 1.

Such a transition can occur if either the MCS maximum is reached, as determined in the step 14, or the power level of the different channelizations has fallen below the target Eb/N0 (Yj) for the MCS under test, as determined in the step 18. If, after one or more repetitions of the inner/outer loops where j_max has been exceeded (step 14) or the channelization power has fallen too low (step 18), then the optimization of the lowest order MCS with the maximal number of channelization codes has finally been determined, according to the present invention.

To that end, a step 26 will then be executed to determine if the current best bit rate (R_curr_best) as set in step 22 for the previous MCS is greater than or equal to the current bit rate (R_curr) as set in step 20 for the last MCS tested. If the current best bit rate (step 22) is greater than the current bit rate (step 20), then this means that the previous MCS under test should be selected. Therefore, if the step 26 determines that the current best bit rate (R_curr_best) of step 22 is greater or equal than the current bit rate (R_curr) of step 20 then the selected bit rate (R_selected) will be set equal to the current best bit rate (R_curr_best) setin step 22, the selected value for N (N_selected) will be set equal to the current best value for N (N_best) from step 22, and the selected value for j (j_selected) will be set equal to the current best MCS (j_best) from step 22. See the step 30 of FIG. 1. After the step 30, the execution of the flowchart of FIG. 1 is completed and an end or return is made in step 34, and this is one way for the optimization of this invention to end.

On the other hand, if the step 26 determines that the current best bit rate (R_curr_best) is not greater than or equal to the current bit rate (R_curr) then it means the previous MCS under test is not optimal and that the last tested MCS should be used. In that event, first a step 32 will be executed in order to find out, is the value of j still smaller than or equal to the maximum MCS in use (j_max), because if the value X can support the maximum number of codes and maximum MCS, then in step 24 the value of j had already been set to a value larger than the maximum MCS (j_max). If j is smaller than or equal to j_max, then in step 36 the selected bitrate (R_selected) is set to be the current bitrate (R_curr) and the selected number of codes (N_selected) will be set to the current number of codes (N_curr) and selected MCS (j_selected) will be set to current MCS (j). After this, the execution of the flowchart of FIG. 1 is completed, and an end or return is made in step 40, and thus this is one way for the optimization of this invention to end. If the value of j is larger than j_max, i.e. the condition in step 32 is not met, then in step 38 the selected bitrate (R_selected) will be set to be the current bitrate (R_curr), the selected number of codes (N_selected) will be set to the current number of codes (N_curr) and the selected MCS (j_selected) will be set to be the maximum MCS (j_max), since this step can be reached only if in step 24 the value of j was already increased to be larger than j_max, which means that the tested value X is so good that it can support the maximum number of codes and maximum MCS and thus the MCS to be selected is the maximum (j_max). After this, the execution of the flowchart of FIG. 1 is completed, and an end or return is made in step 42, and thus this is one way for the optimization of this invention to end.

Another way to carry out this kind of link adaptation is to use look-up tables. In this case Eb/N0 or corresponding value is measured and mapped directly to proper MCS and number of code channels. A way to generate such a look-up table is to use the algorithm described above. The look-up table can be made so that, first with lowest MCS, the allowed number of codes is listed. Then, with the next MCS only those allowed number of code channels are listed that provide a higher bit rate than the maximum bit rate of the previous MCS with the maximum number of codes. The same procedure is made for subsequent MCS sets. This can better utilize the channel quality by using an optimum number of code channels for each MCS. It also allows better granularity if compared to only using the maximum number of codes with different MCS sets (see further discussion of this approach further below).

In this way a two-dimensional optimization of multi-code and MCS is achieved with the best bit rate targeted, according to the present invention. As discussed in more detail below, the MCSs tested by the algorithm can be varied among different possible MCSs with some excluded (i.e., by skipping certain "j" or "N" values).

Some test cases of the network level simulations have been done to evaluate the performance of the present invention. The simulations are done based on the macro scenario defined in ETSI TR 101 112 v3.2.0 (1998–04), "Selection procedures for the choice of radio transmission technologies of the UMTS" (UMTS 30.03 v3.2.0). A single fixed power DSCH is used and is time-shared among the qualified users in a cell. Also, a reference case is simulated with closed-loop power control but without AMC and multi-code scheduling. The available DSCH bit rates for the reference case is designed to match the same bit rates as in one of the test cases with a maximum of 10 multi-codes. In all cases, the mobile speed is 3 km/hr, and the Hybrid ARQ type I with soft combining is used. Also, only a single tap channel is assumed.

Figure 2:
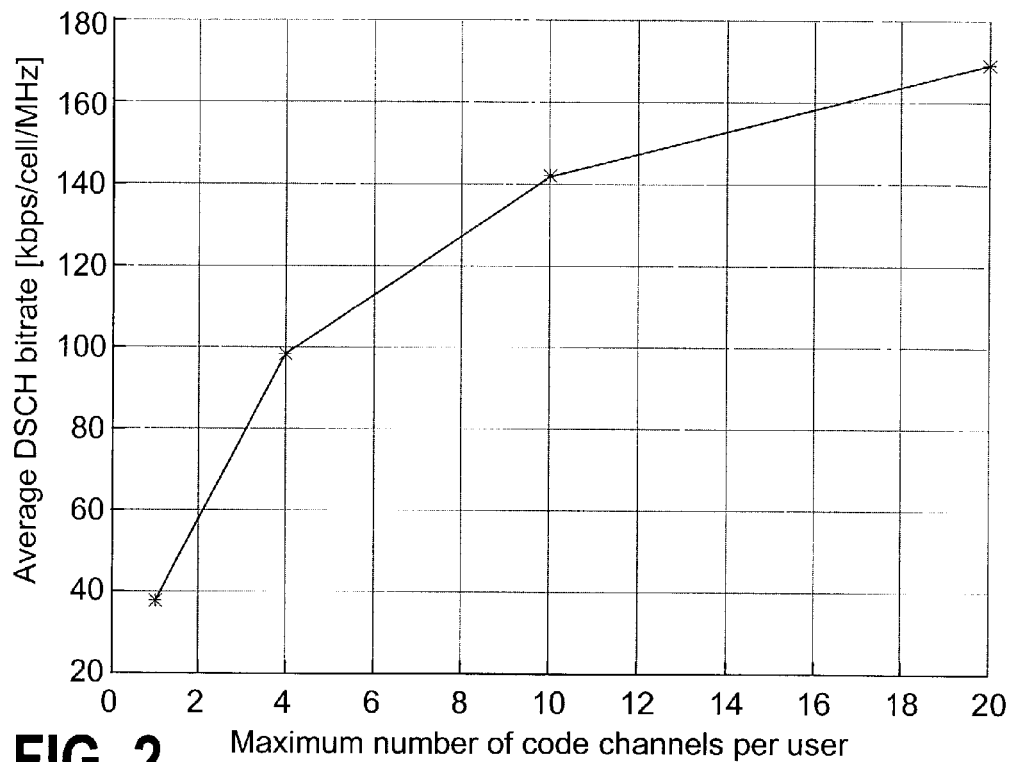
FIG. 2 shows the average DSCH bit rate as a function of the maximum number of channelization codes (code channels) per user for an HSDPA embodiment of the present invention.
Figure 3:
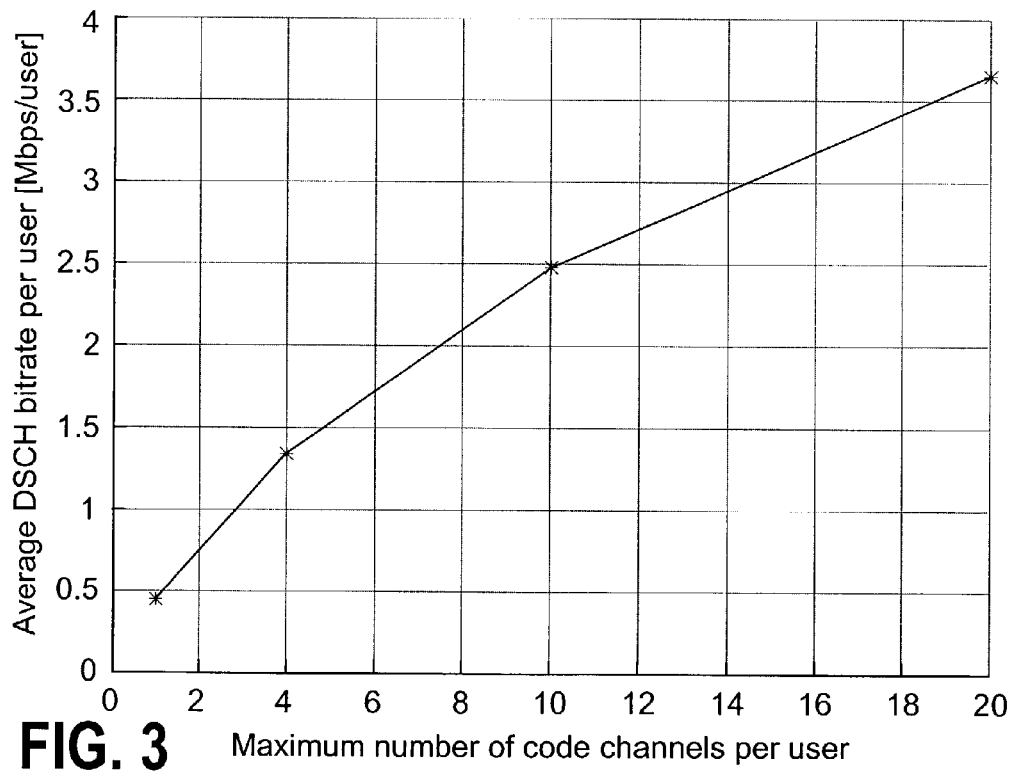
FIG. 3 shows the average DSCH bit rate per connection as a function of the maximum number of code channels per user for the above-mentioned HSDPA embodiment.

FIG. 2 shows the average DSCH network bit rate (kbps/cell/MHz) as a function of the maximum number of code channels per user. The results show that it is possible to provide a multi-fold improvement on the throughput using the algorithm of the present invention. FIG. 3 shows the average DSCH bit rate per connection as a function of the maximum number of code channels per user. As shown in the figure, about an eight-fold improvement can be observed as compared to the single code case. FIG. 4 shows average transfer delay per connection as a function of the maximum number of code channels per user. In this figure, the transfer delay refers to the delay due to the $95^{th}$ percentile of the transmission time of the individual packets in a document over the radio interface and thus contains the user queuing delay and the transmission delay over the radio interface. The use of the multi-code selection scheme can significantly reduce the overall transfer delay down to lower than half of the delay of the single code case. As a comparison, the DSCH network bit rate of the reference case is only about 50 kbps/cell/MHz as compared to 102 kbps/cell/MHz of the 10-code test case (in which the bitrates for the lowest order MCS are roughly comparable to the bitrates in use in the reference case). The use of AMC and the proposed multi-code scheduling scheme improves the DSCH connection throughput per user up from 640 kbps/user (reference case) to 2.65 Mbps/user (test case). Correspondingly, the overall transfer delay decreases from 3400 ms to 1200 ms.

Figure 5:
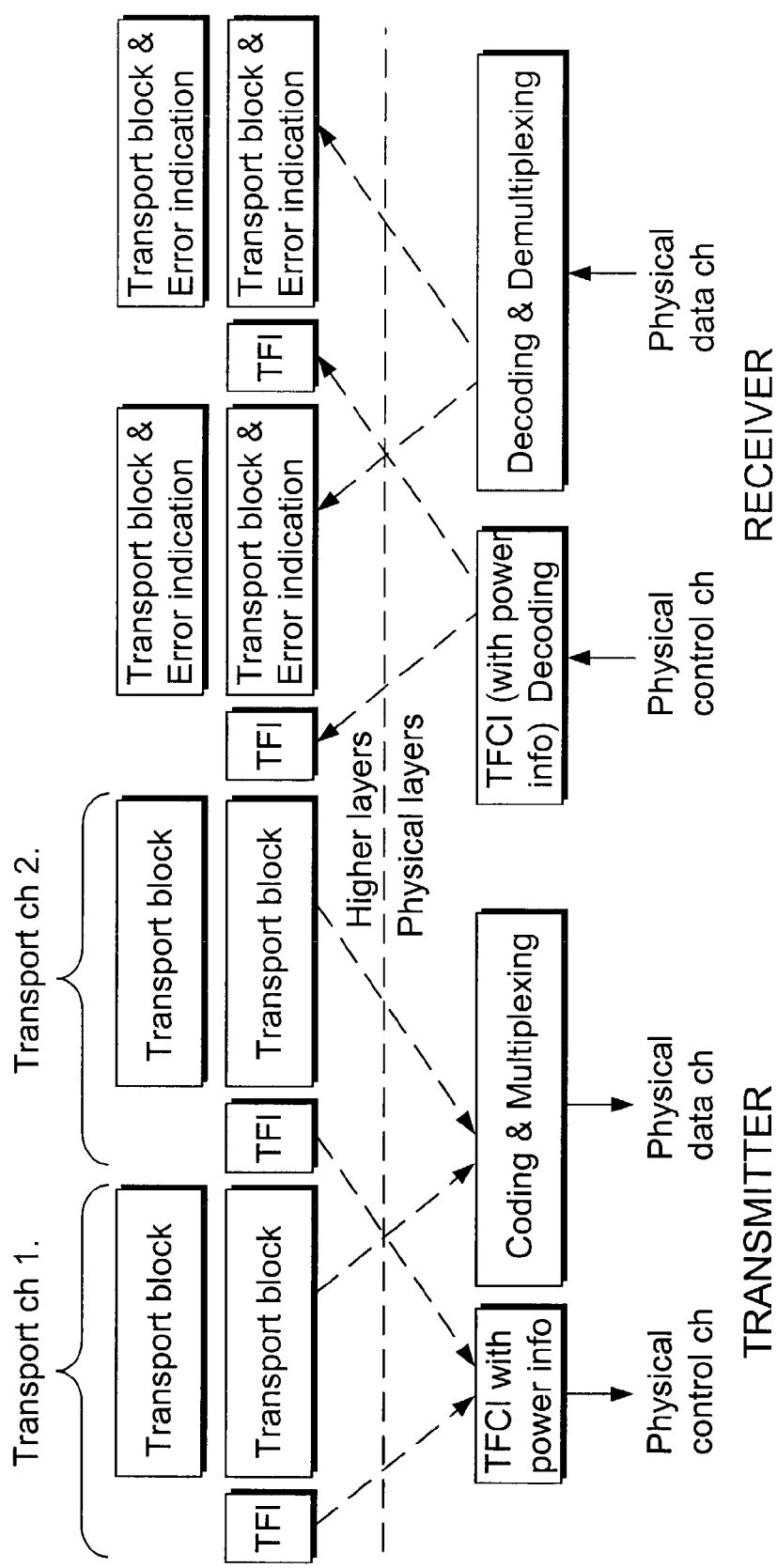
FIG. 5 shows the interface between higher layers and the physical layer for mapping transport channels onto physical channels and physical channels onto transport channels.

Referring now to FIG. 5, it will be seen that at the interface between the physical layer and higher layers there is a mapping of data formed by transport channels to physical channels in the transmitter and vice versa in the receiver. This figure was taken from the text "WCDMA for UMTS" by H. Holma et al at FIG. 6.1. thereof, John Wiley & Sons, Ltd., revised and updated Spring 2001 and has been modified slightly to illustrate one way to carry out the signaling aspect of the present invention. It should be appreciated that a UE can have simultaneously one or several transport channels in the downlink, as well as one or more transport channels in the uplink. FIG. 5 shows only one link, either uplink or downlink, i.e., all transport channels are defined as unidirectional and are in parallel. It should also be appreciated that the UE can fulfill the role of either a transmitter or of a receiver of the MCS information selected according to the present invention. In other words, the UE can be designated to fulfill the role of carrying out the algorithm of FIG. 1 or its equivalent and signaling as a transmitter the results to a Node B acting as a receiver (feed back direction). If the algorithm is carried out in the RNC or Node B, then the Node B will act as transmitter and the UE as receiver (feed forward) direction.

Figure 6:
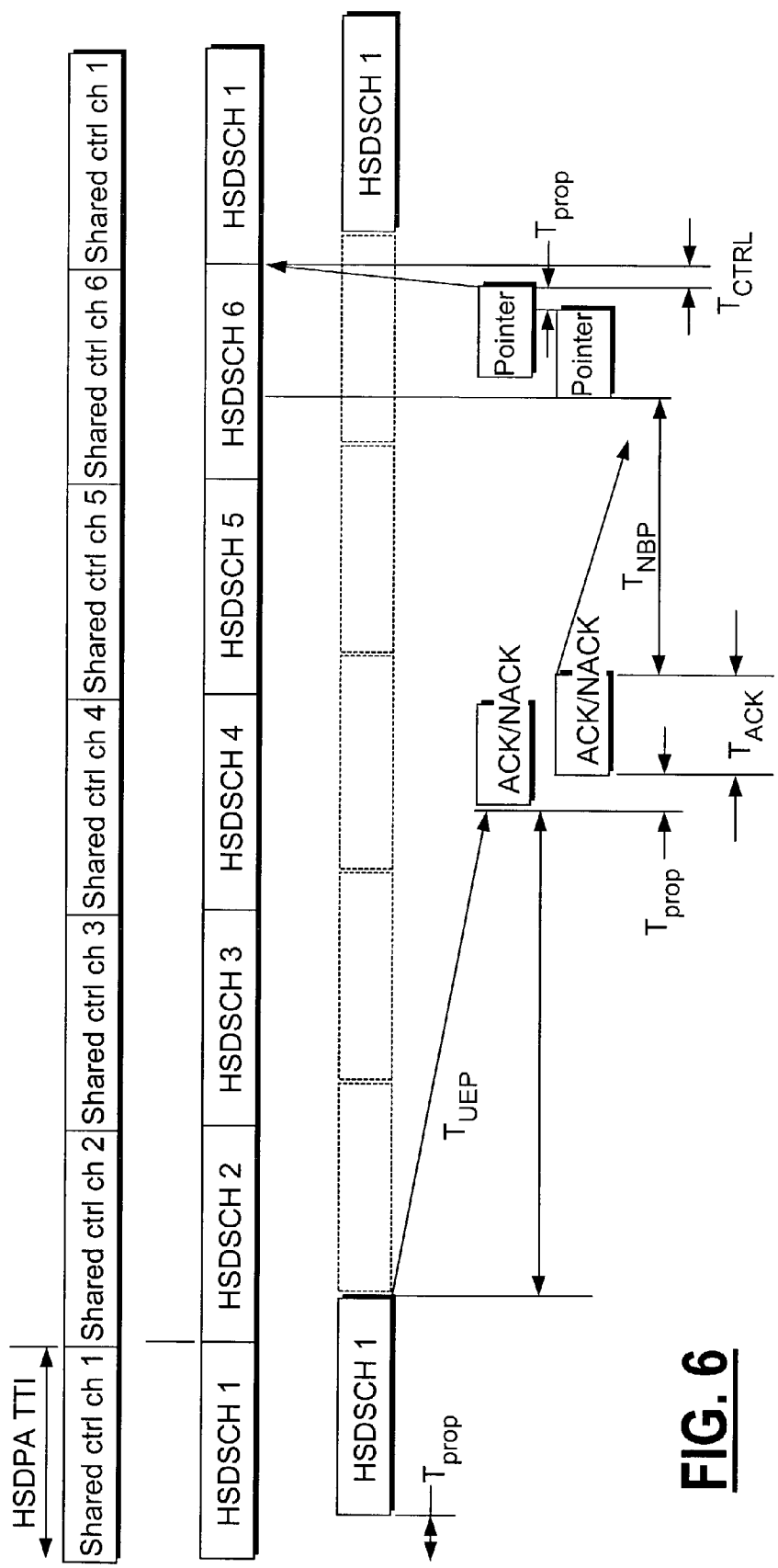
FIG. 6 shows a HARQ timing diagram for six HSDPA channels (N=6).

A transport block is the basic unit exchanged between the physical layer and layer 2 (MAC). A transport block typically corresponds to an RLC PDU or corresponding unit. CRC is added for each transport block by the physical layer. A transport block set (TBS) is shown for both transport channel 1 and transport channel 2 in FIG. 5, comprising two transport blocks for each set. A TBS is exchanged between the physical layer and MAC at the same time instant using the same transport channel. The transport block size is defined as the number of transport bits in a transport block and is always fixed within a given TBS. The TBS size is defined as the number of bits in a transport block set. As shown in FIG. 6 of 3G TS 25.302 v3.3.0 (2000–01), a transmission time interval (TTI) is defined as the inter-arrival time of transport block sets, and is equal to the periodicity at which a TBS is transferred by the physical layer onto the radio interface. It is always a multiple of the minimum interleaving period, e.g., 10 ms, the length of one radio frame. It should be noted that the HSDPA document 3GPP TR 25.950 v4.0.0 (2001–03) at Chapter 6.3.2 mentions supporting an HSDPA TTI shorter than one radio frame (10 ms). In addition, there are proposals for variable TTI. The length of such shorter HSDPA TTI should be selected from the set $\{T_{slot}, 3 \times T_{slot}, 5 \times T_{slot}, 15 \times T_{slot}\}$. The selection of such a shorter HSDPA TTI and possibly a variable TTI are to be based on an evaluation of the impact on performance, delay, network and UE complexity and flexibility (HSDPA payload granularity). The TTI length in HSDPA we prefer as of the filing date hereof is 3 slots=2 ms.

According to the teachings hereof, a TTI=1 slot is too short in the sense that it is very difficult to fit uplink or downlink related HSDPA signaling for each TTI. In the uplink, already ack/nack will reserve 1 slot, since there has to be proper coding for it. And in downlink, it will also mean more overhead, if downlink control signaling would have to be repeated in each slot. Especially it is desired to optimize the timing of certain parameters in downlink, as taught herein, it would be more difficult with a TTI=1 slot case. Thus, according to the present invention, the TTI should be 3 slots, where both uplink and downlink signaling can be fit quite nicely, while also optimizing the timing of certain DL parameters so that UE complexity is minimized.

It should be understood that another size or sizes could be standardized, such as the 1 slot or 5 slots that have been suggested as well as conceivably even 10 ms. In any event, the MAC delivers one transport block set to the physical layer every TTI offered according to a Transport Format. The Transport Format is defined as a format offered by the physical layer to MAC (and vice versa) for the delivery of a transport block set during a transmission time interval on a transport channel. The Transport Format constitutes two parts—one dynamic part and one semi-static part.

The services provided by the physical layer include Transport Formats that are defined to include the above-mentioned dynamic as well as semi-static attributes. The dynamic part includes transport block size, transport set size and transmission time interval (optional dynamic attribute for TDD only). See again FIG. 6 of 3G TS 25.302 v3.3.0 (2000–01) entitled "Services Provided by the Physical Layer." Attributes of the semi-static part are: transmission time interval (mandatory for FDD, optional for the dynamic part of TDD non-real time (NRT) bearers), error protection scheme to apply, and size of CRC. For modulation and coding for shared channels, the modulation scheme of the prior art is fixed (QPSK) and the coding scheme is semi-static, as mentioned above, i.e., not changed from transmission-time-interval (TTI) to TTI. The power level does not have to be signaled, since QPSK is phase modulation.

According to the signaling aspect of the present invention, if the number of channelization codes is varied together with the MCS as per the MCS/multicode optimization aspect of the present invention, this fact as well as the power level of the code channels needs to be known by the UE, especially for multi-level QAM modulation schemes (assuming for example that the algorithm of FIG. 1 is carried out in the RNC or Node B). Therefore, the power level could be signaled to the UE: either as a separate parameter or defined as part of a Transport Format Combination (TFC). Layer 1 multiplexes one or several Transport Channels, and for each Transport Channel, there exists a list of transport formats (Transport Format Set) which are applicable. Nevertheless, at a given point in time, not all combinations may be submitted to layer 1 but only a subset, the Transport Format Combination. This is defined as an authorized combination of the combination of currently valid Transport Formats that can be submitted simultaneously to layer 1 for transmission on a Coded Composite Transport Channel of a UE, i.e., containing one Transport Format from each Transport Channel. The reverse would be true if the algorithm of FIG. 1 or equivalent were carried out in the UE.

Assuming a fixed spreading factor of, for example, SF=16, multiple codes such as ten codes out of the sixteen available can be used for HSDPA use on a Node B. These codes can be communicated to the UE using the Transport Format Combination Indicator (TFCI) of FIG. 5, for example. It will therefore be appreciated that the TFCI of FIG. 5 can be adapted to convey information related to the optimization of the present invention as well as the above-mentioned related power information. The TFCI is a representation of the current Transport Format Combination (TFC). When layer 1 multiplexes one or several transport channels, there will be a number of transport formats available for each transport channel which may be selected from a Transport Format Set (TFS) associated with each channel. Nevertheless, as mentioned already, at any given point in time, not all combinations may be submitted to layer 1, but only a subset called the Transport Format Combination (TFC). This is defined as an authorized combination of the combination of currently-valid Transport Formats that can be submitted simultaneously to layer 1 for transmission on a Coded Composite Transport Channel of a UE, i.e., containing one Transport Format from each Transport Channel. A transport format combination (TFC) of a UE might, for example, have three dedicated channels defined with different possibilities of block sizes and block set sizes available for each channel (dynamic part) along with semi-static TTI size, coding type and static rate matching parameters for each. See Chapter 7.1.8 of 3G TS 25.302 v3.3.0 (2000–01). As mentioned in Chapter 7.1.11 of the foregoing technical specification, there is a one-to-one correspondence between a certain value of the TFCI and a certain TFC. The TFCI is used in order to inform the receiving side of the currently-valid Transport Format Combination, and hence how to decode, demultiplex and deliver the received data on the appropriate transport channels.

The Transport Format Indicator (TFI) is a label for a specific transport format within a transport format set, as defined in Chapters 7.1.6 and 7.1.7, respectively, of 3G TS 25.302 v3.3.0 (2000–01). It is used in the inter-layer communication between MAC and L1 each time a transport block set, as defined in Chapter 7.1.2 of 3G TS 25.302, is exchanged between the two layers on a transport channel. MAC decides which transport format to use from among the choices in the TFS. When DSCH is associated with a DCH, the TFI of the DSCH also indicates the physical channel (i.e., the channelization code) of the DSCH that has to be listened to by the UE.

MAC indicates the TFI to layer 1 at each delivery of transport block sets on each transport channel. Layer 1 then builds the TFCI from the TFIs of all parallel transport channels of the UE, processes the transport blocks appropriately and appends the TFCI to the physical control signaling. Through the detection of the TFCI, the receiving side is able to identify the transport format combination. From the assigned transport format combinations, the receiving side has all the information it needs to decode the information and transfer it to MAC on the appropriate transport channels.

Therefore, it will be appreciated that if the TFCI is utilized as a mechanism for signaling from the transmitting side to the receiving side for signaling the number of channelization codes and corresponding MCS (modulation and coding scheme) in AMC (adaptive modulation and coding), the power level of the code channels can also be signaled so as to be known by the UE for appropriate processing according to the present invention. Therefore, the TFCI of FIG. 5 should be understood as an illustration of the prior art adapted to convey the optimization information of the present invention.

Considering the foregoing, it will be appreciated that the power level can be signaled explicitly with each packet, e.g., on the shared control channel, using a given number of bits to tell the power level (or the power level can be fixed, and then it need not be signaled at all).

The idea is to include a power level into transport format combination, i.e., for instance, create additional MCSs which contain less codes and use more power per code channel. There can be predefined power levels which together with MCS (and code channel info) form the transport format combination and TFCI or TFCI type of signaling is used to indicate the format to be used. The transport format would then include the power level. Another possibility is to extend the MCS to include also the number of code channels and/or power level to be used.

Another important consideration is the processing time available in the UE. We have previously publicly proposed processing time requirements as per Table 1 below. The proposal for processing time requirement for the UE was derived as a combined optimization of buffer sizes and processing times. The proposal was based on the assumption of the timing shown in FIG. 6 and the following assumptions:

N=6 and TTI=3 slots.
Associated DPCH would contain one time slot which we call pointer. Tpointer=1 slot. This is containing:
UE id
MCS
starting point in the code tree.
Shared control channel is assumed to be sent in parallel with HSDSCH TTI, containing:
ARQ parameters
Number of code channels
Tcontrol=1 slot. This is the time that UE will need for decoding the parameters sent in DPCH
Tack=1 slot in uplink.

TABLE 1

UE and Node B processing times based on N = 6, pointer 1 slot.

| Parameter | 3 slot TTI, N = 6 |
|---|---|
| $T_{UEP}$ | 5.00 ms (2.5 × TTI) |
| $T_{NBP}$ | 2.33 ms |

Our view is that the required processing time for the UE is the major issue influencing the UE complexity, taking into account that the highest data rate is around 10 Mbits/s that needs to be processed. Accordingly, our recommendation is that the DL channel structure should be designed so that at least Tuep=5 ms will be available for UE processing time, otherwise it needs to be reconsidered what would be an alternative proposal for N, TTI pair.

Of course we could increase N=6 to N=7, but it would then also mean that required buffer size for the UE would be increased (for the highest class UE supporting 10 Mbit/s), which is not very desirable. Thus, we propose the requirement be that Tuep=5 ms be available for UE processing time. This means that the maximum time over which the DL channel structure is spread over is TDL control=6 slots, taking already into account that the UEs have unsynchronised timing, spread over 1 slot, in associated DPCH. TDL_control=6 slots has been the value used in our earlier DL structure proposal, and that is to what we target also in our new alternative proposal.

Further considerations pertaining to the use a TFCI type mapping philosophy for transport format parameters follow. It has been previously pointed out by others that certain parameters that could be seen as parameters that define the transport format of the HS-DSCH transmission should be transmitted together. These parameters are mainly:
Code multiplexing information
Modulation and coding
HS-DSCH code channel power related information.

The same kind of idea could be used as is defined for TFCI in Release 99, that if we reserve a certain maximum number of bits defining all these three parameters, then it is possible sometimes to define more values for e.g. code multiplexing information and less values for MCS. And sometimes more values for MCSs and less values for code multiplexing etc.

If some of these TF parameters were sent separately, e.g. before the HS-DSCH TTI in associated DCH and some of them in parallel to HS-DSCH TTI in a shared control channel, then a certain amount of flexibility in playing around with these parameter values would be wasted. This is an important point, and it is recommended that one requirement for the HSDPA DL structure would be that it should support the TFCI concept in such way, that sufficient flexibility for TF parameters is maintained. Preferably, this would be accomplished by sending most of these parameters in the same bunch. On the other hand, e.g., ARQ related parameters are not such kind of parameters that need to be combined with TF parameters, so those can, if desired, be sent so that they are not sent in the same bunch with the TF parameters.

We have already publicly raised the issue that certain parameters should be sent before the corresponding HS-DSCH TTI. HSDPA terminals will anyway require very fast processing, which we see as the major complexity issue for the UE. Thus the specification should be defined so that the complexity is minimized for the UE wherever possible. There seems to be consensus that the UE id should be sent beforehand, so that at least continuous processing of HS-DSCH can be avoided.

In addition to that, our proposal is that the TF parameters mentioned above, i.e.,
Code multiplexing information
Modulation and coding
HS-DSCH code channel power related information should be sent beforehand. One benefit of this is that the UE can do the demodulation on the fly and consequently having UE buffers in more than one place can be avoided. Thus buffers at the modulation symbol level can be avoided, since the UE does not have to wait for the end of the HSDSCH TTI, in order to get the information about MCS, code power level and codes. It should be noted that if the demodulation on the fly is not possible, the buffer sizes at the modulation symbol level could also be quite large, since the number of bits needed for quantization is probably more at the modulation symbol level, than what it is at the input of the turbo decoder.

The other benefit is, which we think is the most important issue here, is the optimization of the UE processing time. If the UE can start doing the demodulation on the fly, the processing time available for the UE before sending the ack can be optimized, since it does not have to first wait for the end of the TTI, before it can start doing the demodulation. Since the proposed TTI length is 3 slots, the saving of the processing time at this time scale is clearly very desirable.

Thus, in order to optimize the UE processing time, our proposal is that one requirement for DL structure is that UE id and TF parameters are sent before the corresponding HSDSCH TTI. By "before" we mean that there should be at least one time slot between these parameters and HSDSCH TTI, for allowing time for decoding these parameters.

Figure 7:
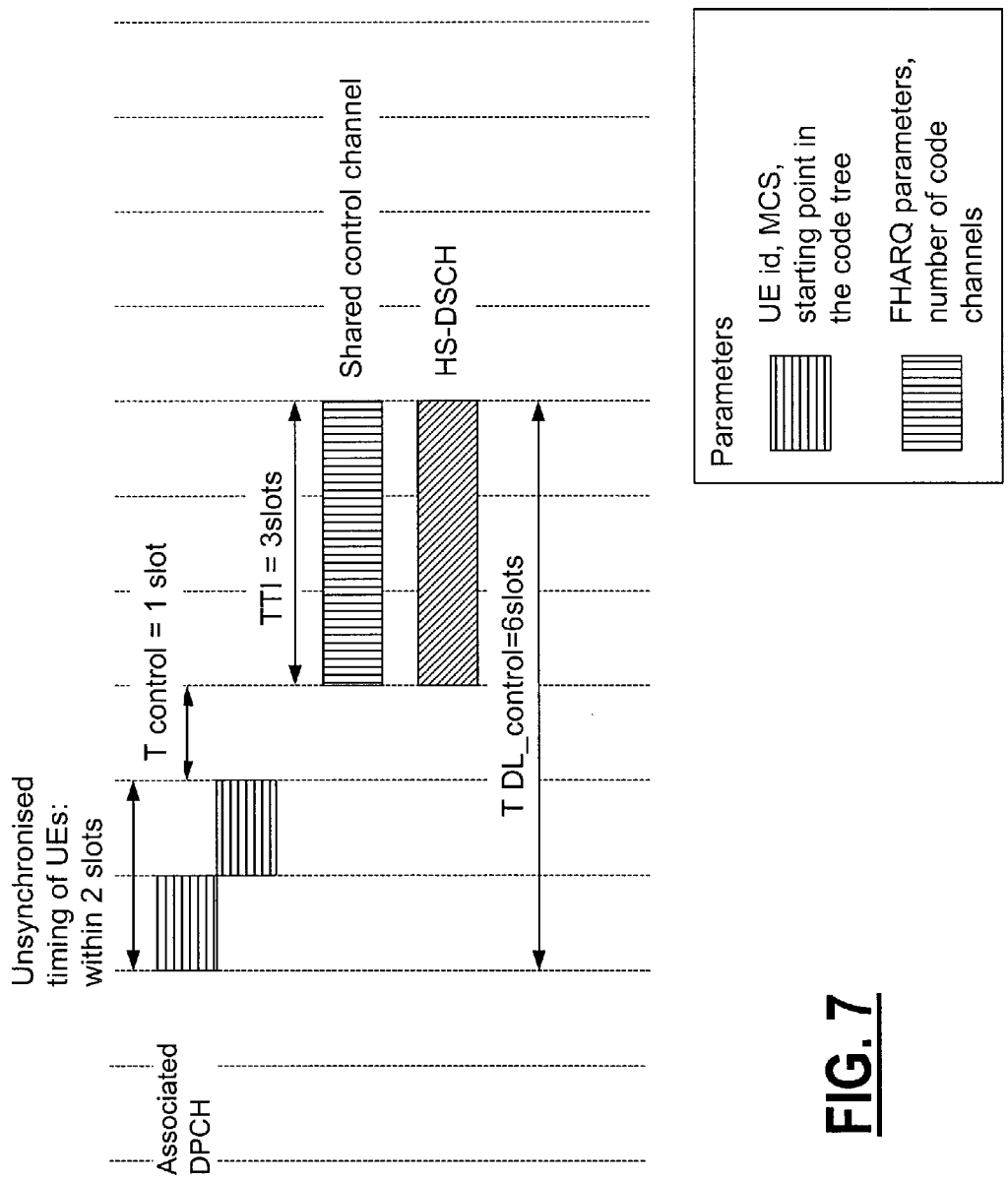
FIG. 7 shows a first HSDPA DL structure.

Two alternative HSDPA DL structures will now be presented. First, an earlier proposal of ours is shown in FIG. 7, based on which we have derived the processing time requirements for the UE described above. This earlier proposal of ours fulfils the following requirements listed above:
1) TTI length=3 slots
2) Results in Tuep=5 ms, meaning that TDL_control, which is the maximum time over which the DL channel structure is spread over, is 6 slots.
3) Those TF parameters which allow the demodulation on the fly (MCS, starting point of the code tree) are all sent before the corresponding HSDSCH TTI. There is 1 slot time to process that information before HSDSCH TTI reception starts.

The requirement that it does not completely fulfill is the following:
4) Full flexibility for TFCI type of mapping is not ensured for TF parameters. The reason for this is that the number of code channels is sent separately from MCS. However, in this structure it is impossible to send number of code channels in the same bunch with MCS, since there is not enough room in DPCH within one slot time period.

Another drawback in this structure, is that it is proposed that code channel power level is not signaled on a per TTI basis. The reason for this is again that there is not enough room in associated DPCH within one slot time period for this kind of parameter. On the other hand we have been saying that for QPSK and 8 PSK, the power level of code channel can be varied per TTI basis without informing that to the UE.

Figure 8:
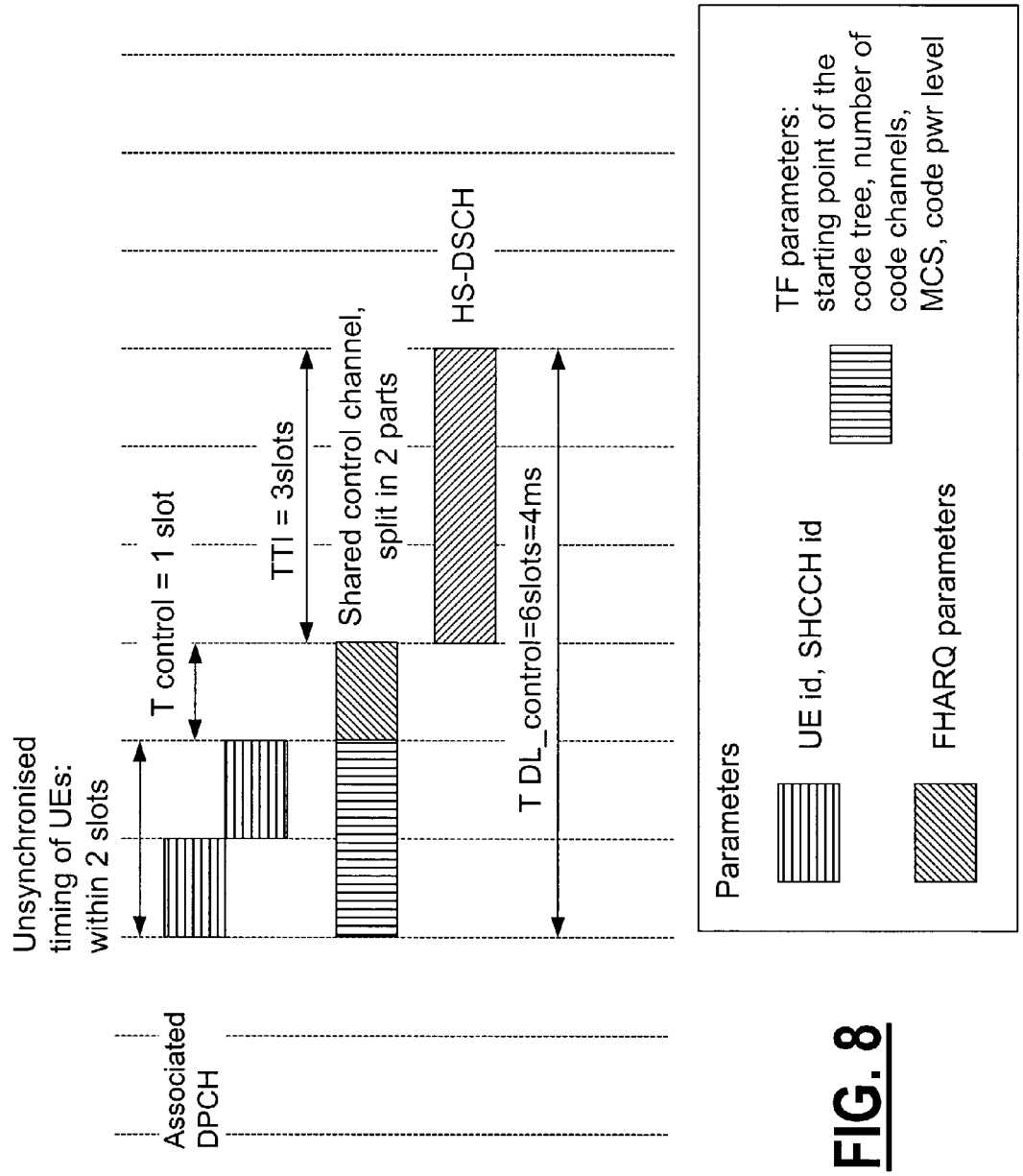
FIG. 8 shows a second HSDPA DL structure.

The second alternative proposed HSDPA DL structure is for the first time shown in FIG. 8. The idea here is that the shared control channel is sent before the corresponding HSDSCH TTI, and that TF parameters and FHARQ parameters are encoded separately. The new structure fulfils all four requirements, defined above:
1) TTI length=3 slots
2) Results in the same Tuep=5 ms as our earlier proposal, meaning that TDL_control, which is the maximum time over which the DL channel structure is spread over, is still 6 slots.
3) Full flexibility for TFCI type of mapping is ensured for TF parameters, meaning that all three parameters: code multiplexing information, MCS and code channel power are sent in the same bunch
4) All TF parameters are sent before the corresponding HSDSCH TTI, to allow UE to do the demodulation on the fly. There is 1 slot time to process that information before HSDSCH TTI reception starts.

The new implication from this new structure is that UE has to receive an SHCCH or several SHCCHs all the time. In case there is code multiplexing of several UEs, there should anyway be a limitation of e.g. that only max K UEs can be code multiplexed to the same TTI. K could be e.g. 2–4. The value of K defines how many SHCCHs the network would send in parallel. It needs, however, further consideration as to whether it would be acceptable for all UEs to receive 4 SHCCHs all the time, since this will increase the number of multicodes that the UE has to receive. One compromise could be to have some kind of predefined mapping of UEs to SHCCHs, and define e.g. that even there would be at maximum 4 SHCCHs sent in parallel by the network, each UE would have to receive e.g. only two SHCCHS of them all the time.

In the foregoing, we have presented the requirements that we think that the HSDPA DL structure should fulfill. One very important aspect we think is to optimize the processing time available to the UE. The other important thing is to define such a kind of structure that supports as flexible a TFCI structure as possible. We have presented again our earlier proposal, where most of the TF parameters are sent on associated DPCH before the corresponding HSDSCH TTI. The main drawback of that structure is that it splits the code multiplexing information in two parts, which will thus not support the TFCI concept in the most flexible way. The other drawback of it is that there is no room for code channel power information in the associated DPCH using that structure. In our new proposal, we propose to send all TF parameters in a shared control channel, before the corresponding HSDSCH TTI. This will ensure that the most flexible TFCI concept can be used, and also that the UE processing time can be optimized. In this structure, however, it still needs further discussion how many shared control channels the UE would have to receive all the time.

The following further considerations relate to multiplexing and channel coding issues for HSDPA. Some open issues are revisited and some proposals are made. Regarding multiplexing of transport channels, the first consideration is the number of transport channels. Different logical channels can be multiplexed at MAC-d into one transport channel, meaning that even a single HS-DSCH transport channel can support several logical channels. However, if different logical channels have very different requirements, e.g., for QoS, then several transport channels for one UE may be needed. This would, e.g., allow higher priority channels to be scheduled first. The current working assumption is that only one transport channel in one TTI would be supported on HS-DSCH. However, it could be possible to have several transport channels time multiplexed into different TTIs. This would have some implications:
different transport channels should have separate HARQ processes (the ARQ processes could have different parameters, e.g., max number of transmissions)
different HARQ processes should be numbered or otherwise separable (synchronous HARQ and asynchronous HARQ with explicit process numbers would support this, asynchronous HARQ with packet numbers only would require some additional numbering)
different transport channels could have different transport formats (block sizes, MCS sets etc.)

A second consideration pertaining to multiplexing of transport channels is transport block sizes. A semi-static transport block size within a transport channel is proposed (if there are several transport channels time multiplexed into different TTIs, these different transport channels could have different transport block sizes). This implies that the MAC-PDU and the RLC-PDU also have to have semi-static size. For acknowledged mode (AM) service this is true already in a recent standardization release, where unacknowledged mode (UM) can have a variable RLC-PDU size. It could be possible to define a variable RLC-PDU size for UM if necessary. This would, however, require additional TFCs since MCS and number of code channels would not be enough to indicate the transport format being used. The transport block size should be selected based on the most robust MCS and the minimum number of code channels allocated for a specific UE. Then changing the MCS and the number of code channels only changes the number of transport blocks per TTI and the transport block size need not change. Also, the MCS set should be selected such that the most robust MCS contains a single transport block and all other MCS's an integer number of transport blocks. Examples are given below.

A third consideration pertaining to multiplexing of transport channels, the number of transport blocks transmitted per TTI, depends on the selected MCS as well as the number of code channels. See the tables below. Based on the selected MCS and the number of codes, MAC-hs will send a known number of transport blocks to the physical layer. Therefore, normally the number of transport blocks need not be signaled separately. However, at the end of a packet call/session there can be an arbitrary number of MAC-PDUs to be transmitted.

If there is a single MAC-PDU to be transmitted, then the most robust MCS and the minimum number of codes should be used, even if the channel conditions would allow the use of less robust MCS. This simply implies that the block will go through with higher probability.

If there are many MAC-PDUs to be transmitted such that no combination of MCS and number of codes has that number of transport blocks, there are several possibilities. For example, consider the MCS set in Table 3 and assume that there are 7 MAC-PDUs (transport blocks) to be transmitted and the channel conditions would allow to use MCS with QPSK with rate 1/2 and 8 codes, i.e., 8 transport blocks could be transmitted with that mode. There are (at least) three possibilities:

Send first 6 transport blocks with QPSK, rate 1/2 and 6 codes and then 1 block with QPSK, rate 1/4 and 2 codes. This does not require any extra signalling but wastes some capacity and causes small extra delay.

Send all 7 transport blocks and use rate matching to fill the TTI. This is best solution from performance point of view but requires extra signalling, i.e., the number of transport blocks should be signalled too (additional TFC)

Send all 7 transport blocks and an additional dummy block added by MAC-hs. Physical layer would treat this as 8 blocks and the MAC-hs in the receiving end should remove the dummy block. This would not require extra physical layer signalling but wastes some energy.

A fourth consideration relating to multiplexing of transport channels, regarding code channel usage, a fixed spreading factor of SF=16 has been proposed for standardization and that multiple codes be used for high data rates. It has been suggested that, e.g., 10 codes could be reserved for HSDPA use on a Node B. Even if there were 10 codes available on a given Node B for HSDPA, not all codes need to be used for a given user within a TTI. There are several reasons not to transmit all the codes to a user:

Code multiplexing of several 'medium' bit rate users within a TTI, e.g., 2 to 4 users could be multiplexed.

Transmit less codes with higher power to a user at bad conditions, say, at cell edge. Here the total Node B power allocated for HSDPA is assumed to be divided between the code channels thus giving higher power per code channel. This would typically use QPSK with low rate code and therefore, code channel power needs not be signalled.

Using higher MCS with full number of codes may not be possible (quality target not met), and lower MCS with full number of codes may significantly exceed the target. In this case it might be good to use the higher MCS with less codes (and total HSDPA power divided between these codes). For instance use QPSK, rate 3/4 with 6 codes instead of QPSK, rate 1/2 with 8 codes (full HSDPA power used for a user in both cases).

Figure 9:
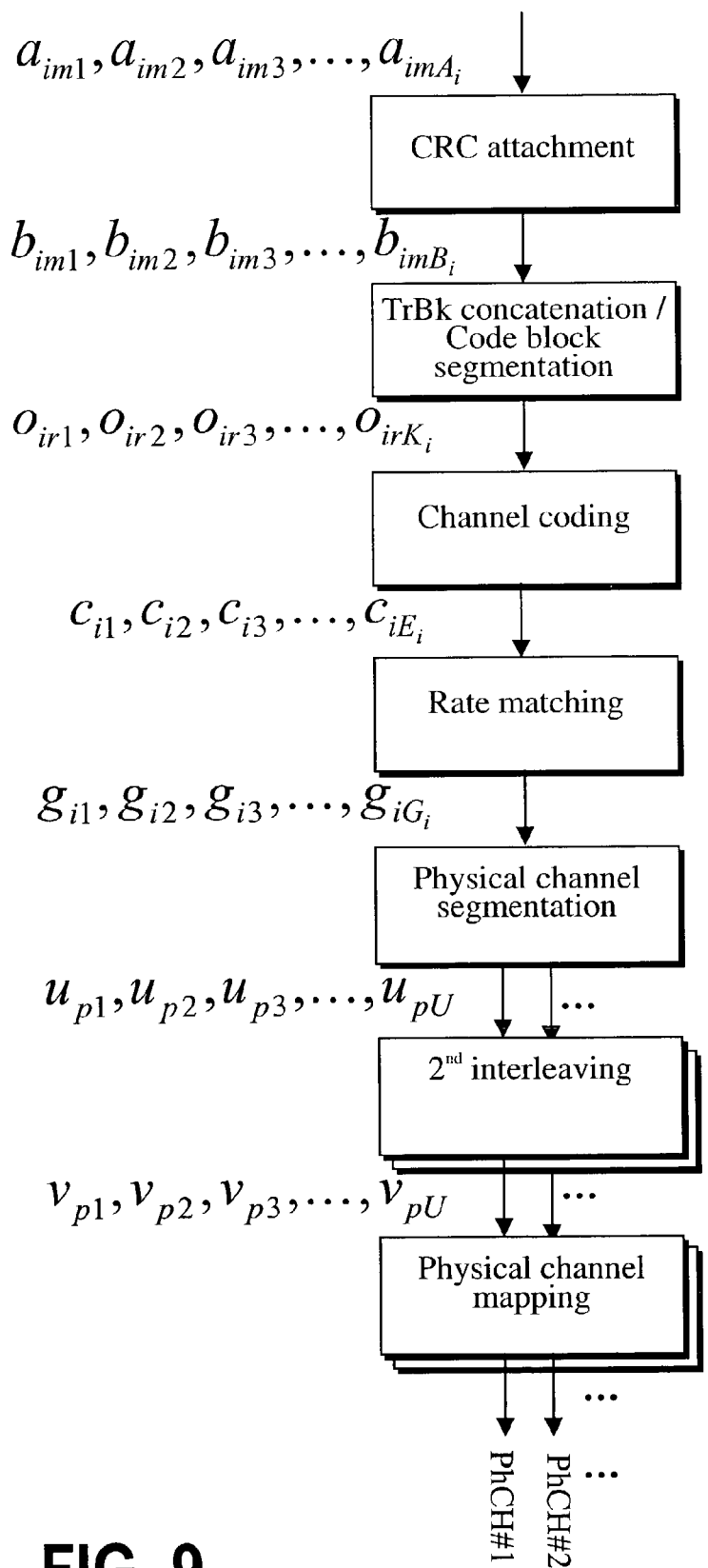
FIG. 9 shows a transport channel coding structure for HSDPA.

Regarding the physical layer channel coding chain for HSDPA, FIG. 9 depicts the transport channel coding structure for HSDPA.

For error detection, the same CRC lengths as for previous standardization releases are proposed for HSDPA. The current working assumption is that the CRC is added per HSDPA TTI. The reason for this is that the HARQ retransmits the whole TTI if there are errors in any of the transport blocks. This saves some overhead. This, however, implies that the number of bits with different MCSs and different number of code channels are not integer multiples of each other and rate matching has to be used to fill the frame. The CRC could also be added for each transport block as in an earlier release. This would facilitate MCS changes somewhat (rate matching is not needed to fill the frame). Also, if MAC layer HARQ cannot correct the whole TTI (max number of transmissions reached), some of the RLC-PDUs might though be correct and could therefore be delivered to higher layers.

It is a working assumption that the same transport block concatenation and code block segmentation as in previous releases will be used for HSDPA. The maximum code block size for turbo coding is 5114.

Only turbo coding is supported on HS-DSCH. The existing rate 1/3 coding and puncturing with the existing rate matching can be used to get other code rates such as 3/4, 1/2, 3/8. Even rate 1/4 could be generated from rate 1/3 with repetition. Alternatively, a new lower rate encoder can be specified.

The same rate matching algorithm as in previous releases should be used for HSDPA. The rate matching in HSDPA is used for several purposes:

Different code rates for different MCS's can be generated with rate matching (puncturing or repetition)

Repetition (or less puncturing) can be used to fill the frame (to avoid DTX) like in uplink. However, it is better to choose the transport block size such that no extra filling is needed. This is possible as shown in the Annex A.

No extra signalling is needed for rate matching: MCS and the fixed transport block size (configured at call setup) define the amount of rate matching. Note that rate matching is not needed to balance the performance of different transport channels since only one transport channel is transmitted per HSDPA TTI.

Since the HSDPA TTI is fixed, only second interleaving is needed.

Use of DTX with higher order modulation is not as straightforward as with QPSK: e.g., how to map a four bit sequence with one bit removed into 16 QAM constellation. Two possible alternatives were presented in an earlier DTX proposal. An alternative to DTX is to use rate matching repetition to fill the frame (cf. uplink). With HS-DSCH this is possible since only one transport channel per TTI is supported and therefore, rate matching is not needed to balance the performance of different transport channels of a CCTrCH. Note that the power level should not be changed even if the repetition is used. The improved performance due to repetition simply reduces the block error rate and therefore reduces the number of retransmissions (and delay). Our proposal is to use rate matching repetition (or less puncturing) to fill the frame instead of using DTX. However, it is better to choose the transport block size such that no extra filling is needed.

As for physical channel mapping, the bits can be mapped to different code channels in the same way as in earlier standardization releases.

To summarize the foregoing consideration: (1) the number of transport channels supported by HSDPA needs to be decided; (2) transport block size should be semi-static and based on the most robust MCS; (3) MCS should be such that only one transport block size is needed (to avoid RLC level resegmentation); (4) the number of transport blocks should not be a separate parameter, i.e., MCS and number of code channels should implicitly tell also the number of transport blocks (possibility to add dummy blocks if needed at MAC-hs should be studied); (5) adding CRC to each transport block should be reconsidered; and (6) rate matching should be used instead of DTX to fill the TTI.

Possible MCS sets based on a semi static transport block size are presented below. Bits/TTI gives the number of information bits per TTI. It should be noted that in the tables several alternatives are given for some data rates. This doesn't mean that all these alternatives are proposed. They are simply showing that there are several ways of getting different data rates. In the end, an appropriate subset of these schemes should be selected based on performance and implementation complexity.

TABLE 2

MCS set derived from QPSK 1/4, 5 codes
SF = 16, transport block size 1200 bits (including CRC)

| | 5 codes | | | | 10 codes | | | |
|---|---|---|---|---|---|---|---|---|
| MCS | # trblks | Bits/TTI | # code blks | Code blk size | # trblks | Bits/TTI | # code blks | Code blk size |
| QPSK, rate 1/4 | 1 | 1200 | 1 | 1200 | 2 | 2400 | 1 | 2400 |
| QPSK, rate 1/2 | 2 | 2400 | 1 | 2400 | 4 | 4800 | 1 | 4800 |
| QPSK, rate 3/4 | 3 | 3600 | 1 | 3600 | 6 | 7200 | 2 | 3600 |
| 16QAM, rate 1/2 | 4 | 4800 | 1 | 4800 | 8 | 9600 | 2 | 4800 |
| 16QAM, rate 3/4 | 6 | 7200 | 2 | 3600 | 12 | 14400 | 3 | 4800 |
| 64QAM, rate 3/4 | 9 | 10800 | 3 | 3600 | 18 | 21600 | 5 | 4320 |

Figure 11:
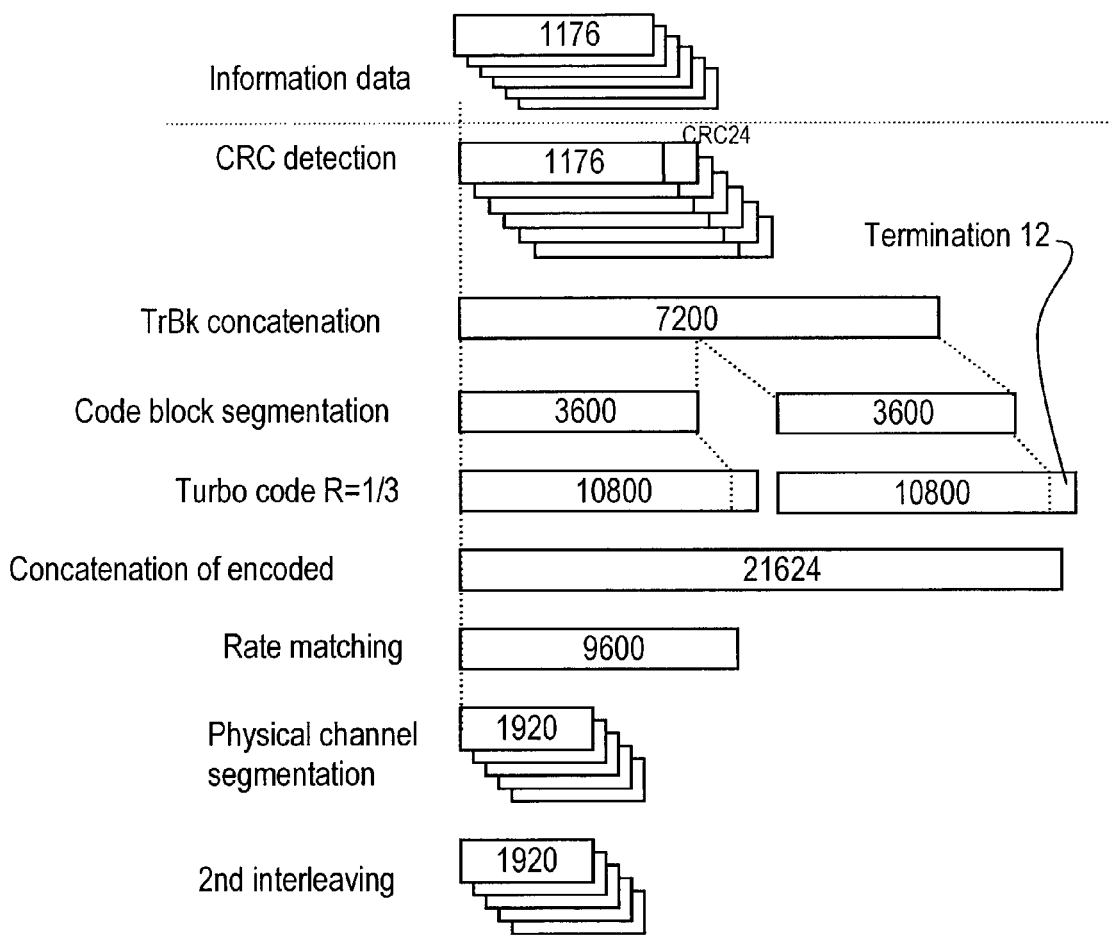
FIG. 11 shows a second example of channel coding and physical segmentation for the QPSK ¾, 5 codes of Table 2.

FIGS. 10 and 11 show channel coding and physical channel segmentation for two example MCS of Table 2.

TABLE 3

MCS set derived from QPSK 1/4, 2 codes, including 8PSK
SF = 16, transport block size 480 bits (including CRC)

| | 2 codes | | 4 codes | | 6 codes | | 8 codes | |
|---|---|---|---|---|---|---|---|---|
| MCS | # trblks | Bits/TTI | # trblks | Bits/TTI | # trblks | Bits/TTI | # trblks | Bits/TTI |
| QPSK, rate 1/4 | 1 | 480 | 2 | 960 | 3 | 1440 | 4 | 1920 |
| QPSK, rate 1/2 | 2 | 960 | 4 | 1920 | 6 | 2880 | 8 | 3840 |
| QPSK, rate 3/4 | 3 | 1440 | 6 | 2880 | 9 | 4320 | 12 | 5760 |
| 8PSK, rate 1/2 | 3 | 1440 | 6 | 2880 | 9 | 4320 | 12 | 5760 |
| 8PSK, rate 2/3 | 4 | 1920 | 8 | 3840 | 12 | 5760 | 16 | 7680 |
| 8PSK, rate 5/6 | 5 | 2400 | 10 | 4800 | 15 | 7200 | 20 | 9600 |
| 16QAM, rate 1/2 | 4 | 1920 | 8 | 3840 | 12 | 5760 | 16 | 7680 |
| 16QAM, rate 5/8 | 5 | 2400 | 10 | 4800 | 15 | 7200 | 20 | 9600 |
| 16QAM, rate 3/4 | 6 | 2880 | 12 | 5760 | 18 | 8640 | 24 | 11520 |
| 64QAM, rate 3/4 | 9 | 4320 | 18 | 8640 | 27 | 12960 | 36 | 17280 |

TABLE 4

MCS set derived from QPSK 3/8, 5 codes
SF = 16, transport block size 1800 bits (including CRC)

| | 5 codes | | | | 10 codes | | | |
|---|---|---|---|---|---|---|---|---|
| MCS | # trblks | Bits/TTI | # code blks | Code blk size | # trblks | Bits/TTI | # code blks | Code blk size |
| QPSK, rate 3/8 | 1 | 1800 | 1 | 1800 | 2 | 3600 | 1 | 3600 |
| QPSK, rate 3/4 | 2 | 3600 | 1 | 3600 | 4 | 7200 | 2 | 3600 |

TABLE 4-continued

MCS set derived from QPSK 3/8, 5 codes
SF = 16, transport block size 1800 bits (including CRC)

| | 5 codes | | | | 10 codes | | | |
|---|---|---|---|---|---|---|---|---|
| MCS | # trblks | Bits/TTI | # code blks | Code blk size | # trblks | Bits/TTI | # code blks | Code blk size |
| 8PSK, rate 1/2 | 2 | 3600 | 1 | 3600 | 4 | 7200 | 2 | 3600 |
| 8PSK, rate 3/4 | 3 | 5400 | 2 | 2700 | 6 | 10800 | 3 | 3600 |
| 16QAM, rate 9/16 | 3 | 5400 | 2 | 2700 | 6 | 10800 | 3 | 3600 |
| 16QAM, rate 3/4 | 4 | 7200 | 2 | 3600 | 8 | 14400 | 3 | 4800 |
| 64QAM, rate 3/4 | 6 | 10800 | 3 | 3600 | 12 | 21600 | 5 | 4320 |

TABLE 5

MCS set derived from QPSK 1/3, 5 codes
SF = 16, transport block size 1600 bits (including CRC)

| | 5 codes | | | | 10 codes | | | |
|---|---|---|---|---|---|---|---|---|
| MCS | # trblks | Bits/TTI | # code blks | Code blk size | # trblks | Bits/TTI | # code blks | Code blk size |
| QPSK, rate 1/3 | 1 | 1600 | 1 | 1600 | 2 | 3200 | 1 | 3200 |
| QPSK, rate 2/3 | 2 | 3200 | 1 | 3200 | 4 | 6400 | 2 | 3200 |
| 16QAM, rate 1/2 | 3 | 4800 | 1 | 4800 | 6 | 9600 | 2 | 4800 |
| 16QAM, rate 2/3 | 4 | 6400 | 2 | 3200 | 8 | 12800 | 3 | 4266.66 |
| 16QAM, rate 5/6 | 5 | 8000 | 2 | 4000 | 10 | 16000 | 4 | 4000 |
| 64QAM, rate 2/3 | 6 | 9600 | 2 | 4800 | 12 | 19200 | 4 | 4800 |

It should be mentioned again, with reference to FIG. 1, that not all possible MCSs have to be tested. Some MCSs can be selected for testing and others skipped. In other words, "j" does not have to step through every value 1, 2, 3, 4, 5, 6, . . . etc. Another sequence can be chosen. One possibility is that the UE will, based on the measurements, report the MCS it wants instead of SIR. This can be considered as a coarse SIR measurement or request. In this case the corresponding SIR values can be as far as 6 dB from each other. Therefore, it may be possible define some 'intermediate MCSs' between the actual MCSs in order to have more accurate SIR, e.g., one or two intermediate MCSs could be between each 'real' MCS, thus getting 3 or 2 dB granularity in the measurement. In practice, these intermediate MCSs would represent the existing MCSs with less (or more) channelization codes. For instance, we could have a MCS set:
MCS0: no transmission
MCS1: QPSK 1/4 (where 1/4 means rate 1/4 turbo code)
MCS2
MCS3: QPSK 1/2
MCS4
MCS5: QPSK 3/4
MCS6
MCS7:16 QAM 3/4
MCS8
MCS9: 64 QAM 3/4

Here MCSs with even number represent the intermediate MCSs and UE could also use them when signalling the measurements in the uplink, i.e., if the channel is such that MCS7 is not possible with full number of codes but could be possible with less codes (giving higher data rate than MCS5 with full number of codes), then the UE can ask for MCS6.

Typically (e.g., it the MCS set above), the data rates between MCSs are (at maximum) multiples of two, e.g., MCS1 and MCS3 or MCS5 and MCS7. If there are for instance max 12 channelization codes available for HS-DSCH, then MCS1 with 12 codes and MCS3 with 6 codes give the same data rate. However, the more robust MCS (MCS1 in this case) should give better performance (if the total HS-DSCH power is allocated for a UE). Therefore, the 'intermediate MCS' should contain more than half of the codes in order to have higher data rate.

To be more specific, the MCS should actually also contain the number of codes. For instance
MCS0: no transmission
MCS1: QPSK 1/4, 3 codes
MCS2: QPSK 1/4, 6 codes
MCS3: QPSK 1/4, 9 codes
MCS4: QPSK 1/4, 12 codes
MCS5: QPSK 1/2, 9 codes
MCS6: QPSK 1/2, 12 codes
MCS7: QPSK 3/4, 9 codes MCS8: QPSK 3/4, 12 codes
MCS9: 16 QAM 3/4, 9 codes
MCS10: 16 QAM 3/4, 12 codes
MCS11: 64 QAM 3/4, 9 codes
MCS12: 64 QAM 3/4, 12 codes Note that the number of codes associated to each MCS can be arbitrary, e.g., MCS11 above could have 10 codes. However, as mentioned earlier the less robust MCS with less codes should provide a higher data rate than the more robust MCS with more codes (if the data rates were the same, the more robust MCS would give better performance anyway). Nonetheless, such a listing or table with various possible MCSs along with "allowed" multicodes may be provided for selection, according to radio link conditions.

With e.g., 4 bits it is possible to signal 16 different MCSs, i.e., combinations of MCS and number of code channels.

The UE would use these to tell the Node B the quality of the link or channel assuming that the full HSDPA power is allocated to that UE. The packet scheduling algorithm in Node B can then allocate the UE also less codes (e.g., if it wants to code multiplex more users at the same time). For instance if two users (UE1 and UE2) are code multiplexed both with max 6 codes, and UE1 has asked for MCS5 and UE2 wants MCS8, then Node B could allocate UE1 QPSK 1/2 with 4 codes (and half HSDPA power) and for UE2 QPSK 3/4 with 6 codes (and half HSDPA power).

In the downlink, the Node B has to finally decide and tell the UE what the actual MCS is, the number of codes and which codes, as well as the power level used. (UE does not know whether less codes are allocated with full power or because of code multiplexing with less power). In the downlink, TFCI type of signalling can be used as described earlier.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method for use in adaptively modulating a radio link in a mobile communications system according to a time varying radio link quality, comprising:
   adaptively selecting a number of channelization codes and a modulation scheme from among a plurality of modulation schemes for use by a transmitter in sending data on a shared data channel over the radio link according to said time varying radio link quality, and
   signaling information relating to said adaptively selected modulation scheme and said number of channelization codes on a shared control channel from said transmitter to a receiver of said radio link wherein said signaling information is for transmission prior to transmission of automatic repeat request parameters also signaled in said shared control channel.

2. The method of claim 1, wherein said modulation scheme and said number of channelization codes are selected from a prestored look-up table.

3. The method of claim 2, wherein said look-up table is made with a number of possible channelization codes associated with each modulation scheme.

4. The method of claim 1, further comprising measuring said radio link quality prior to said step of adaptively selecting.

5. The method of claim 4, wherein said measuring is carried out in a user equipment acting as said receiver of said radio link.

6. The method of claim 5, wherein said signaling comprises providing a measurement signal from said user equipment to said transmitter of said radio link, said measurement signal having a magnitude indicative of said radio link quality measured in said measuring.

7. The method of claim 6, wherein said measurement signal is indicative of a current highest possible data rate to meet a target radio link quality.

8. The method of claim 7, wherein said highest possible data rate is indicated by a highest order modulation scheme with which said target radio link quality is met.

9. The method of claim 8, wherein said modulation scheme contains the number of channelization codes and the modulation scheme.

10. The method of claim 8, wherein said modulation scheme contains the number of channelization codes, the modulation scheme, and a number of bits per transmission time interval.

11. The method of claim 5, further comprising said user equipment, based on measurements made in said measuring, selecting a modulation scheme and reporting said selected modulation scheme to said transmitter as a requested modulation scheme for said use by said transmitter in adaptively modulating said radio link.

12. The method of claim 11, further comprising said transmitter, after receiving said requested modulation scheme from said receiver, deciding said information relating to said adaptively selected modulation scheme and said number of channelization codes.

13. The method of claim 12, wherein said user equipment selecting a modulation scheme includes selecting said number of channelization codes and wherein said reporting said selected modulation scheme includes reporting said selected number of channelization codes.

14. The method of claim 11, wherein said selected modulation and coding scheme is indicative of a current highest possible data rate to meet a target radio link quality.

15. The method of claim 14, wherein said highest possible data rate is indicated by a highest order modulation and coding scheme with which said target radio link quality is met.

16. The method of claim 15, wherein said modulation and coding scheme contains the number of channelization codes, the modulation scheme and a code rate of an error correcting scheme.

17. The method of claim 15, wherein said modulation and coding scheme contains the number of channelization codes, the modulation scheme, and a number of bits per transmission time interval.

18. The method of claim 1, wherein said transmitter is a user equipment.

19. The method of claim 1, wherein said receiver is a user equipment.

20. The method of claim 19, wherein said testing is carried out along with measuring said radio link quality by said user equipment.

21. The method of claim 1, wherein said signaling is carried out using a transport format indicator.

22. Method for use in adaptively modulating a radio link in a mobile communications system according to a time varying radio link quality, comprising:
   adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link, wherein said modulation and coding scheme and said number of channelization codes are selected from a pre-stored look-up table, wherein said look-up table is made with a number of possible channelization codes associated with each modulation and coding scheme, wherein said look-up table is made so that, first with a lower modulation and coding scheme, all allowed channelization codes are listed and wherein for each subsequent modulation and coding scheme only code channels are listed that provide a higher bit rate than a maximum bit rate of a previous modulation and coding scheme with a maximum number of allowed channelization codes.

23. The method of claim 22, wherein at least part of said signaling information is for transmission on a shared control channel prior to said transmitter transmitting a shared data channel.

24. The method of claim 23, wherein said control channel is organized to transmit said information relating to the modulation of said adaptively selected modulation and coding scheme and to said number of channelization codes prior to automatic repeat request parameters also transmitted on said control channel.

25. The method of claim 22, wherein said signaling for transmission on a control channel organized to transmit said signaling information relating to at least a modulation scheme of said adaptively selected modulation and coding scheme and at least said number of channelization codes prior to automatic repeat request parameters also transmitted on said control channel.

26. Method for use in adaptively modulating a radio link in a mobile communications system according to a time varying radio link quality, comprising:

adaptively selecting a number of channelization codes and a modulation scheme for use by a transmitter in sending data on a shared data channel over the radio link, and signaling information relating to said adaptively selected modulation scheme and said number of channelization codes on one shared control channel of a plurality of shared control channels limited to a maximum number of shared control channels from said transmitter to a receiver of said radio link, wherein said receiver need only receive fewer than said maximum number of shared control channels.

27. The method of claim 26, wherein said maximum number of parallel control channels is four and each user equipment only receives two of them.

28. Method for use in adaptively modulating a radio link in a mobile communications system according to a time varying radio link quality, comprising:

adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link further comprising measuring said radio link quality prior to said step of adaptively selecting, wherein said measuring is carried out in a user equipment acting as said receiver of said radio link, further comprising said user equipment, based on measurements made in said measuring, selecting a modulation and coding scheme and reporting said selected modulation and coding scheme to said transmitter as a requested modulation and coding scheme for said use by said transmitter in adaptively modulating said radio link, wherein said signaling is carried out by said transmitter transmitting said information on a control channel shared among a plurality of user equipment receivers, wherein said transmitter begins transmitting said information on said control channel prior to when said transmitter begins transmitting a downlink shared channel of said adaptively modulated radio link to said user equipment receivers, and wherein either or both said downlink shared channel and said control channel have a transmission time interval equal to two milliseconds or three slots.

29. The method of claim 28, wherein a user equipment processing time for responding to a packet is between two and three transmission time intervals.

30. The method of claim 28, wherein said information transmitted on said control channel for a given transmission time interval of said downlink shared channel is organized to transmit said number of channelization codes and modulation scheme before other information in a control channel transmission time interval starting before said given transmission time interval of said downlink shared channel.

31. Method for use in adaptively modulating a radio link in a mobile communications system according to a time varying radio link quality, comprising the steps of:

adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link, further comprising a step of measuring said radio link quality prior to said step of adaptively selecting, wherein said measuring is carried out in a user equipment acting as said receiver of said radio link, wherein said adaptively selecting and signaling are carried out in said transmitter or elsewhere than in said user equipment acting as said receiver of said radio link, said method further comprising the step of providing a measurement signal from said user equipment to said transmitter of said radio link, said measurement signal having a magnitude indicative of said radio link quality measured in said step of measuring, wherein said measurement signal is indicative of a current highest possible data rate to meet a target radio link quality, and wherein said measurement signal includes a possibility of signaling that no transmission is possible when selecting from among said plurality of modulation and coding schemes.

32. Method for use in adaptively modulating a radio link in a mobile communications system according to a time varying radio link quality, comprising:

adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link, measuring said radio link quality prior to said adaptively selecting wherein said measuring is carried out in a user equipment acting as said receiver of said radio link, further comprising said user equipment, based on measurements made in said measuring, selecting a modulation and coding scheme and reporting said selected modulation and coding scheme to said transmitter as a requested modulation and coding scheme for said use by said transmitter in adaptively modulating said radio link wherein said selected modulation and coding scheme is indicative of a current highest possible data rate to meet a target radio link quality wherein said measurement signal includes a possibility of signaling that no transmission is possible when selecting from among said plurality of modulation and coding schemes.

33. Method for use in adaptively modulating a radio link in a mobile communications system according to a time varying radio link quality, comprising:

adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link wherein for a target radio link quality, said step of adaptively selecting comprises:

testing, one after another, increasingly higher order modulation and coding schemes each capable of achieving a specified error measure for said channel having said target radio channel quality, and selecting a highest order modulation and coding scheme that tests for a maximum allowed number of channelization codes or less without falling below said target radio channel quality.

34. Method for use in adaptively modulating a radio link in a mobile communications system according to a time varying radio link quality, comprising:

adaptively selecting a number of channelization codes and a modulation and coding scheme from among a plurality of modulation and coding schemes for use by a transmitter over the radio link according to said time varying radio link quality, and signaling information relating to said adaptively selected modulation and coding scheme and said number of channelization codes from said transmitter to a receiver of said radio link wherein for a target radio channel quality, said step of adaptively selecting comprises:

starting with a lowest order modulation and coding scheme capable of achieving a specified error measure according to said time varying radio channel quality, testing said lowest order modulation and coding scheme with an increasing number of channelization codes at correspondingly different bit rates until a highest number of channelization codes is tested for said lowest order modulation and coding scheme or for a subsequently tested higher order modulation and coding scheme without causing the channel to fall below said target radio channel quality and thereafter selecting said lowest order modulation and coding scheme or a lowest higher order modulation and coding scheme that tests for said highest number of channelization codes without causing the channel to fall below said target radio channel quality.

35. The method of claim 34, further comprising signaling information related to said selected lowest order modulation and coding scheme or lowest higher order modulation and coding scheme from said transmitter to said receiver.

36. The method of claim 35, wherein said signaling is carried out using a transport format indicator.

37. Method for selecting a modulation and coding scheme for use in a mobile communications system, comprising:

selecting a modulation and coding scheme capable of achieving a specified error measure for a channel having a time-varying radio channel quality, and selecting a number of channelization codes that are useable with said selected modulation and coding scheme without falling below a target radio channel quality including the possibility of selecting an indication that no transmission is possible.

38. The method of claim 37, further comprising signaling information relating to said selected modulation and coding scheme from a transmitter of said system to a receiver of said system.

39. The method of claim 38, wherein said signaling is carried out using a transport format indicator.

40. The method of claim 38, wherein said transmitter is a user equipment.

41. The method of claim 38, wherein said receiver is a user equipment.

42. The method of claim 37, wherein said modulation and coding scheme and said number of channelization codes are selected from a prestored look-up table.

43. The method of claim 42, wherein said look-up table is made with a number of possible code channels associated with each modulation and coding scheme.

44. The method of claim 43, wherein said user equipment selecting a modulation and coding scheme includes selecting a number of channelization codes and wherein said reporting said selected modulation and coding scheme includes reporting said selected number of channelization codes as a requested number of channelization codes.

45. The method of claim 38, further comprising measuring said radio channel quality prior to said steps of selecting.

46. The method of claim 45, wherein said measuring is carried out in a user equipment.

47. The method of claim 46, wherein said selecting and said signaling are carried out in said transmitter or elsewhere than in said user equipment acting as said receiver of said radio link.

48. The method of claim 47, further comprising providing a measurement signal from said user equipment to said transmitter of said radio channel, said measurement signal having a magnitude indicative of said radio channel quality received at said user equipment.

49. The method of claim 48, wherein said measurement signal is indicative of a highest order modulation and coding scheme that allows for a maximum allowed number of channelization codes or less without falling below a target radio channel quality.

50. The method of claim 46, further comprising said user equipment, based on measurements made in said measuring, selecting a modulation and coding scheme and reporting said selected modulation and coding scheme to said transmitter as a requested modulation and coding scheme.

51. The method of claim 50, wherein said signaling is carried out by said transmitter transmitting said information on a control channel shared among a plurality of user equipment receivers.

52. The method of claim 51, wherein said information is transmitted on said control channel prior to said transmitter transmitting a downlink shared transport channel to said user equipment receivers.

53. The method of claim 52, wherein said control channel is organized to transmit said information relating to said selected modulation scheme and said channelization codes prior to automatic repeat request parameters also transmitted on said control channel.

54. The method of claim 50, further comprising said transmitter, after receiving said requested modulation and coding scheme from said receiver, carrying out said steps of selecting said modulation and coding scheme and said number of channelization codes.

55. Method for selecting a modulation and coding scheme for use in a mobile communications system, comprising:
   selecting a modulation and coding scheme capable of achieving a specified error measure for a channel having a time-varying radio channel quality, and
   selecting a number of channelization codes that are useable with said selected modulation and coding scheme without falling below a target radio channel quality,
   wherein said modulation and coding scheme and said number of channelization codes are selected from a prestored look-up table,
   wherein said look-up table is made with a number of possible code channels associated with each modulation and coding scheme,
   wherein said look-up table is made so that, first with a lowest modulation and coding scheme, all allowed channelization codes are listed and wherein for each subsequent modulation and coding scheme only code channels are listed that provide a higher bit rate than a maximum bit rate of a previous modulation and coding scheme with a maximum number of allowed channelization codes.

56. Method for selecting a modulation scheme for use in a mobile communications system, comprising:
   selecting a modulation scheme capable of achieving a specified error measure for a channel having a time-varying radio channel quality, and
   selecting a number of channelization codes that are useable with said selected modulation scheme without falling below a target radio channel quality, further comprising signaling information relating to said selected modulation scheme from a transmitter of said system to a receiver of said system,
   further comprising measuring said radio channel quality prior to said steps of selecting,
   wherein said measuring is carried out in a user equipment,
   further comprising said user equipment, based on measurements made in said measuring, selecting a modulation scheme and reporting said selected modulation scheme to said transmitter as a requested modulation scheme,
   wherein said signaling is carried out by said transmitter transmitting said information on a control channel shared among a plurality of user equipment receivers,
   wherein said control channel is organized to transmit said information relating to said selected modulation scheme and channelization codes prior to automatic repeat request parameters also transmitted on said control channel.

57. Method for selecting a modulation and coding scheme for use in a mobile communications system, comprising:
   selecting a modulation and coding scheme capable of achieving a specified error measure for a channel having a time-varying radio channel quality, and
   selecting a number of channelization codes that are useable with said selected modulation and coding scheme without falling below a target radio channel quality,
   signaling information relating to said selected modulation and coding scheme from a transmitter of said system to a receiver of said system,
   measuring said radio channel quality prior to said selecting,
   wherein said measuring is carried out in a user equipment,
   further comprising said user equipment, based on measurements made in said step of measuring, selecting an modulation and coding scheme and reporting said selected modulation and coding scheme to said transmitter as a requested modulation and coding scheme,
   wherein said signaling is carried out by said transmitter transmitting said information on a control channel shared among a plurality of user equipment receivers,
   wherein said information is transmitted on said control channel prior to said transmitter transmitting a downlink shared transport channel to said user equipment receivers,
   wherein either or both said downlink shared channel and said control channel have a transmission time interval equal to two milliseconds or three slots.

58. The method of claim 57, wherein a user equipment processing time for responding to a packet is between two and three transmission time intervals.

59. The method of claim 57, wherein said information transmitted on said control channel for a given transmission time interval of said downlink shared channel is organized to transmit said number of channelization codes and a modulation scheme used before other information in a control channel transmission time interval starting before said given transmission time interval of said downlink shared channel.

60. Method for selecting a modulation and coding scheme for use in a mobile communications system, comprising:
   selecting a modulation and coding set capable of achieving a specified error measure for a channel having a time-varying radio channel quality,
   selecting a number of channelization codes that are useable with said selected modulation and coding set without falling below a target radio channel quality,
   signaling information relating to said selected modulation and coding set from a transmitter of said system to a receiver of said system,
   measuring said radio channel quality prior to said steps of selecting,
   wherein said measuring is carried out in a user equipment,
   wherein said selecting and signaling are carried out in said transmitter or elsewhere than in said user equipment acting as said receiver of said radio link,
   further comprising providing a measurement signal from said user equipment to said transmitter of said radio channel, said measurement signal having a magnitude indicative of said radio channel quality received at said user equipment,
   wherein said measurement signal is indicative of a highest order MCS that allows for a maximum allowed number of channelization codes or less without falling below a target radio channel quality,
wherein said measurement signal includes the possibility of signaling that no transmission is possible.

61. Method for use in a mobile communications system having a radio channel with a time-varying radio channel quality, said method for adaptively selecting a modulation and coding scheme from among a plurality of modulation and coding schemes of differing orders of complexity, wherein for a given adaptation based on a radio channel quality, said method comprises:
  starting with a lowest order modulation and coding scheme and thereafter continuing with higher order modulation and coding schemes all capable of achieving a specified error measure according to the time-varying radio channel quality, testing said lowest order modulation and coding scheme with increasingly larger numbers of channelization codes at correspondingly different bit rates until a maximum allowed number of channelization codes or less is tested for said lowest order modulation and coding scheme or for a subsequently tested higher order modulation and coding scheme without causing the radio channel to fall below said target radio channel quality and thereafter
  selecting said lowest order modulation and coding scheme or selecting a highest order modulation and coding scheme available that tests for said maximum allowed number of channelization codes or less without causing the radio channel to fall below the target radio channel quality.

62. The method of claim 61, further comprising signaling information related to said selected lowest order modulation and coding scheme or highest order modulation and coding scheme from a transmitter to a receiver of said radio channel.

63. The method of claim 62, wherein said signaling is carried out using a transport format combination indicator.

64. The method of claim 62, further comprising measuring said radio channel quality prior to said step of selecting.

65. The method of claim 64, wherein said measuring is carried out in a user equipment.

66. The method of claim 65, wherein said testing and said selecting are carried out in said transmitter or elsewhere than in said user equipment acting as said receiver of said radio link.

67. The method of claim 66, wherein said transmitter is a base station or radio network controller.

68. The method of claim 66, wherein said signaling is carried out by said transmitter transmitting said information on a control channel shared among a plurality of user equipment receivers.

69. The method of claim 68, wherein at least part of said information is transmitted on said control channel prior to said transmitter transmitting a downlink shared channel to said user equipment receiver.

70. The method of claim 69, wherein said control channel is organized to transmit at least part of said information relating to said adaptively selected modulation and coding scheme and said number of channelization codes prior to automatic repeat request parameters also transmitted on said control channel.

71. The method of claim 69, wherein either or both said downlink shared channel and said control channel have a transmission time interval equal to two milliseconds or three slots.

72. The method of claim 71, wherein a user equipment processing time for responding to a packet is between two and three transmission time intervals.

73. The method of claim 71, wherein said information transmitted on said control channel for a given transmission time interval of said downlink shared channel is organized to transmit said number of channelization codes and a modulation scheme before other information in a control channel transmission time interval and starting before said given transmission time interval of said downlink shared channel.

74. The method of claim 68, wherein said control channel is organized to transmit at least part of said information relating to said adaptively selected modulation and coding scheme and said number of channelization codes prior to automatic repeat request parameters also transmitted on said control channel.

75. The method of claim 61, wherein said modulation and coding schemes are available for said testing in association with said channelization codes from a prestored look-up table.

76. The method of claim 75, wherein said look-up table is made with a number of possible code channels associated with each modulation and coding scheme.

77. The method of claim 75, wherein said look-up table is made so that, first with a lowest modulation and coding scheme, all allowed channelization codes are listed and wherein for each subsequent modulation and coding scheme only code channels are listed that provide a higher bit rate than a maximum bit rate of a previous modulation and coding scheme with a maximum number of allowed channelization codes.

78. The method of claim 75, further comprising said user equipment, based on measurements made in said measuring, carrying out said steps of testing, selecting and signaling information to said receiver.

79. The method of claim 78, further comprising said receiver, after receiving said information signaled from said user equipment, deciding said information based on a target radio channel quality and signaling same to said user equipment.

80. Method for use in adaptively modulating a radio link in a mobile communications system according to a time varying radio link quality, comprising:
  measuring said radio link quality in a receiver of said radio link, and
  providing a measurement signal from said receiver of said radio link to a transmitter of said radio link wherein said measurement signal is indicative of a current highest possible data rate to meet a target radio link quality and wherein said measurement signal includes a possibility of signaling that no transmission is possible.

81. Method for use in maximizing throughput while minimizing errors at a target link quality in a mobile communications system, comprising:
  adaptively selecting a number of channelization codes and a modulation and coding scheme from among a plurality of modulation and coding schemes for use by a transmitter over the radio link according to said time varying radio link quality such that said throughput is maximized by optimizing said number of channelization codes and said modulation and coding scheme wherein for increasing modulation and coding complexity only channelization codes are allowed that provide a higher bit rate than a maximum bit rate of a previous modulation and coding scheme with a maximum number of allowed channelization codes, and signaling information related to said adaptively selected modulation and coding scheme and said number of channelization codes from said transmitter to a receiver of said radio link.

82. Method for use in adaptively modulating a radio link in a mobile communications system according to a time varying radio link quality, comprising:

adaptively selecting a number of channelization codes and a modulation scheme from among a plurality of modulation schemes for use by a transmitter in sending data on a shared data channel over the radio link according to said time varying radio link quality, and signaling information relating to said adaptively selected modulation scheme and said number of channelization codes on a shared control channel from said transmitter to a receiver of said radio link wherein said signaling information is for transmission prior to transmission of automatic repeat request parameters also signaled in said shared data channel.

* * * * *